United States Patent
Morita et al.

(10) Patent No.: US 7,873,059 B2
(45) Date of Patent: Jan. 18, 2011

(54) GATEWAY DEVICE

(75) Inventors: Chihiro Morita, Tokyo (JP); Kosuke Yagi, Tokyo (JP); Kiyoyasu Maruyama, Tokyo (JP); Maki Yukawa, Tokyo (JP); Shigeo Ando, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 95 days.

(21) Appl. No.: 12/224,505

(22) PCT Filed: Feb. 27, 2007

(86) PCT No.: PCT/JP2007/053607

§ 371 (c)(1),
(2), (4) Date: Dec. 19, 2008

(87) PCT Pub. No.: WO2007/099939

PCT Pub. Date: Sep. 7, 2007

(65) Prior Publication Data

US 2009/0252176 A1    Oct. 8, 2009

(30) Foreign Application Priority Data

Mar. 1, 2006  (JP) .............................. 2006-055058
Mar. 22, 2006 (JP) .............................. 2006-079601

(51) Int. Cl.
*H04L 12/28* (2006.01)
(52) U.S. Cl. ...................................... 370/401; 710/316
(58) Field of Classification Search ................. 370/401; 710/316
See application file for complete search history.

(56) References Cited

U.S. PATENT DOCUMENTS

| 6,963,925 | B1 | 11/2005 | Ishikawa et al. |
| 7,191,327 | B2 * | 3/2007 | Viljoen et al. ............... 713/2 |

(Continued)

FOREIGN PATENT DOCUMENTS

| JP | 2001-7861 A | 1/2001 |
| JP | 2001-242876 A | 9/2001 |
| JP | 2003-46535 A | 2/2003 |
| JP | 2003-125358 A | 4/2003 |
| JP | 2004-304318 A | 10/2004 |
| JP | 2005-512401 A | 4/2005 |
| WO | WO-2006/095868 A1 | 9/2006 |

*Primary Examiner*—Dang T Ton
*Assistant Examiner*—Wei Zhao
(74) *Attorney, Agent, or Firm*—Birch, Stewart, Kolasch and Birch, LLP

(57) ABSTRACT

Provided is a gateway device for interconnecting an IEEE1394 network and an IP network, which automatically detects and operates an AV device connected to the IEEE1394 network from a player device connected to the IP network, thereby enabling the player device to watch and hear contents stored in the AV device. The gateway device interconnects a network, to which an AV/C installed IEEE1394 device is connected, and a network, to which a player device compliant with a UPnP is connected, and includes: a conversion unit for converting Plug-and-Play processing of the IEEE1394 device to each step of Plug-and-Play of the UPnP; a conversion unit for converting an action of a UPnP AV to an AV/C command of the IEEE1394 device; and a stream transfer unit for transferring stream data transmitted from the IEEE1394 device to the IP network.

17 Claims, 21 Drawing Sheets

U.S. PATENT DOCUMENTS

| | | |
|---|---|---|
| 2001/0013128 A1 | 8/2001 | Hagai et al. |
| 2003/0110298 A1 | 6/2003 | Lanigan |
| 2003/0206238 A1* | 11/2003 | Kawai et al. ........... 348/333.01 |
| 2004/0221088 A1* | 11/2004 | Lisitsa et al. ................. 710/316 |
| 2006/0168341 A1* | 7/2006 | Keller-Tuberg ............. 709/242 |

* cited by examiner

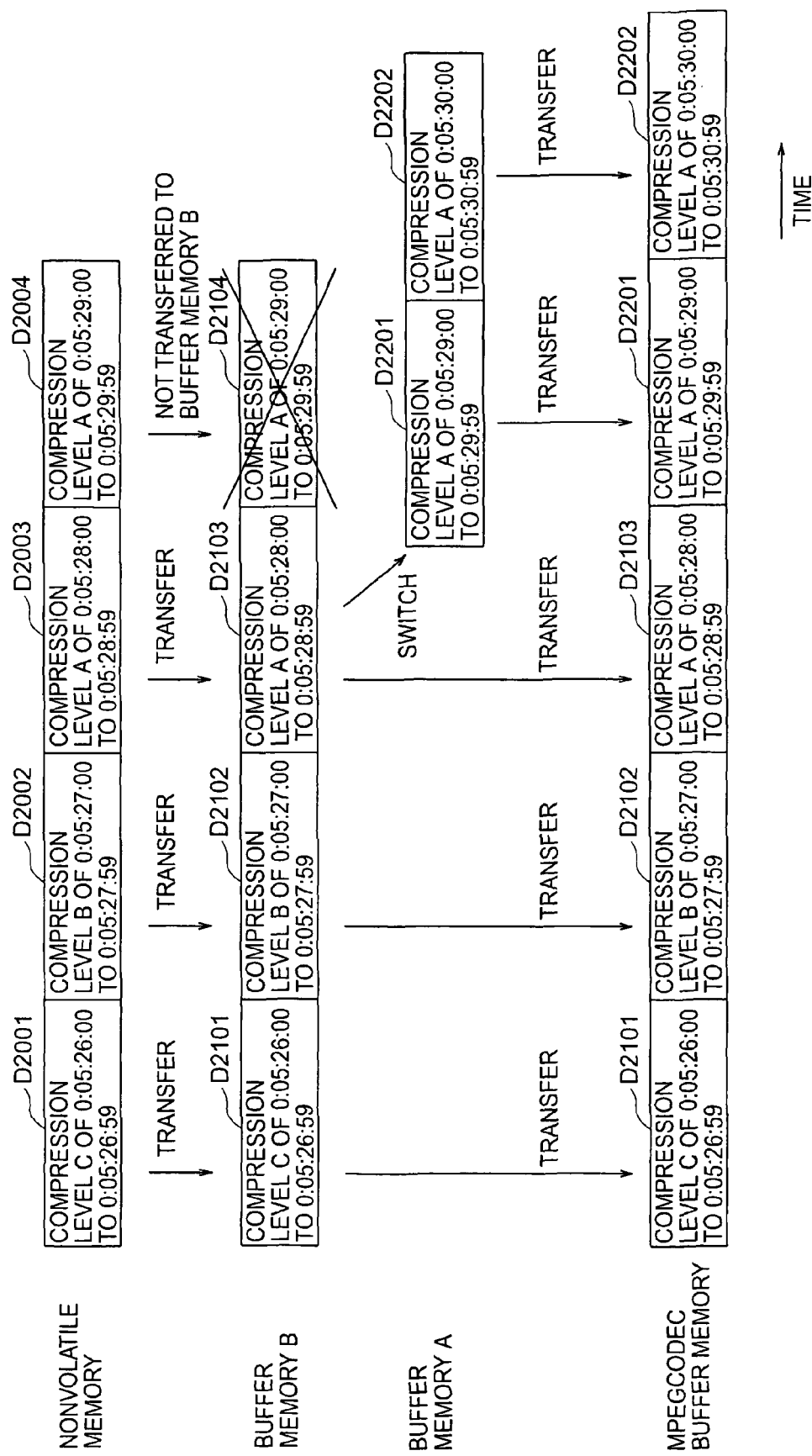

GATEWAY DEVICE

TECHNICAL FIELD

The present invention relates to a gateway device, and more particularly, to a gateway device for a technology of detecting and controlling an AV/C installed IEEE1394 device as a virtual UPnP device, and transferring a moving image stream transmitted via an network to an IP network.

BACKGROUND ART

Conventionally, an IEEE1394 has frequently been used as a network interface of an AV device. With popularization of personal computers and the Internet, however, AV devices using interfaces of Internet Protocol (hereinafter, abbreviated as "IP") such as Ethernet (registered trademark) have been on the increase. To interconnect networks of different protocols such as the IP and the IEEE1394, a gateway device has been arranged between the networks to configure a function. For example, to connect the IP network with the IEEE1394 network, an action of a UPnP that corresponds to an AV/C command of the IEEE1394 device is defined, and the gateway device converts the action of the UPnP and the AV/C command, thereby controlling the AV device connected to the IEEE1394 network from a UPnP control point connected to the IP network (e.g., refer to Patent Document 1).

The gateway device generates a web page corresponding to a subunit of the AV/C, thereby controlling a device connected to the IEEE1394 network from a web browser installed in a personal computer or the like connected to the IP network (e.g., refer to Patent Document 2).

Patent Document 1: Japanese Patent Application Laid-open No. 2003-46535

Patent Document 2: Japanese Patent Application Laid-open No. 2005-94683

DISCLOSURE OF THE INVENTION

Problems to be solved by the Invention

However, in the case of the method of converting the action of the UPnP into the AV/C command, it is only the AV/C command that can be operated from the UPnP control point of the IP network. Thus, there has been a problem that a player of the personal computer or the like of the IP network is inhibited from operating the AV device of the IEEE1394 to watch and hear audio and video contents stored in the AV device.

Also, a new UPnP control point that can understand the AV/C command has to be generated. Thus, there has been a problem that, for example, a DLNA-compliant player which employs a standard UPnP AV cannot operate the AV device to watch and hear contents.

In the case of the method using the web browser, there has been a problem that a player of the web browser personal computer cannot directly watch and hear contents of the IEEE1394 device.

When AV data is read from a server connected to the network to watch and hear contents by the player, response time from the server of the connection destination is necessary. Thus, a user has to stand by for several seconds or several tens of seconds after power of a playback device is turned on. As a result, there has been a problem that usability is lower as compared with a conventional video cassette recorder.

The present invention has been developed to solve the aforementioned problems, and is directed to a gateway device for interconnecting an IEEE1394 network and an IP network, which automatically detects and operates an AV device connected to the network from a player device such as a personal computer or the like connected to the IP network, thereby enabling the player device to watch and hear audio and video contents stored in the AV device.

Means for solving the Problems

According to the present invention, there is provided a gateway device including: first communication means connected to a first network to communicate with a device connected to the first network; second communication means connected to a second network to communicate with a device connected to the second network; identifier management means for outputting an identifier in the first network; correlation means for starting a program corresponding to the device connected to the second network to correlate the program with the identifier; command conversion means for converting a command of the first network into a command of the second network; and stream transfer means for converting stream data transmitted from the second network based on a transfer protocol of the second network into a transfer protocol of the first network to transfer the stream data to the first network. The gateway device operates, according to a command from the device connected to the first network, the device connected to the second network to transfer the stream data stored in the device to the device connected to the first network.

EFFECTS OF THE INVENTION

The present invention provides a gateway device including: first communication means connected to a first network to communicate with a device connected to the first network; second communication means connected to a second network to communicate with a device connected to the second network; identifier management means for outputting an identifier in the first network; correlation means for starting a program corresponding to the device connected to the second network to correlate the program with the identifier; command conversion means for converting a command of the first network into a command of the second network; and stream transfer means for converting stream data transmitted from the second network based on a transfer protocol of the second network into a transfer protocol of the first network to transfer the stream data to the first network. The gateway device operates, according to a command from the device connected to the first network, the device connected to the second network to transfer the stream data stored in the device to the device connected to the first network. Thus, the present invention advantageously enables automatically detecting and operating an AV device connected to the IEEE1394 network from a player device of a personal computer or the like connected to the IP network, thereby enabling the player device to watch and hear audio and video contents stored in the AV device.

BRIEF DESCRIPTION OF THE DRAWINGS

FIG. 27 is an explanatory diagram illustrating a data compression ratio in the gateway device according to Embodiment 4 of the present invention.

BEST MODE FOR CARRYING OUT THE INVENTION

Embodiment 1

Figure 1:
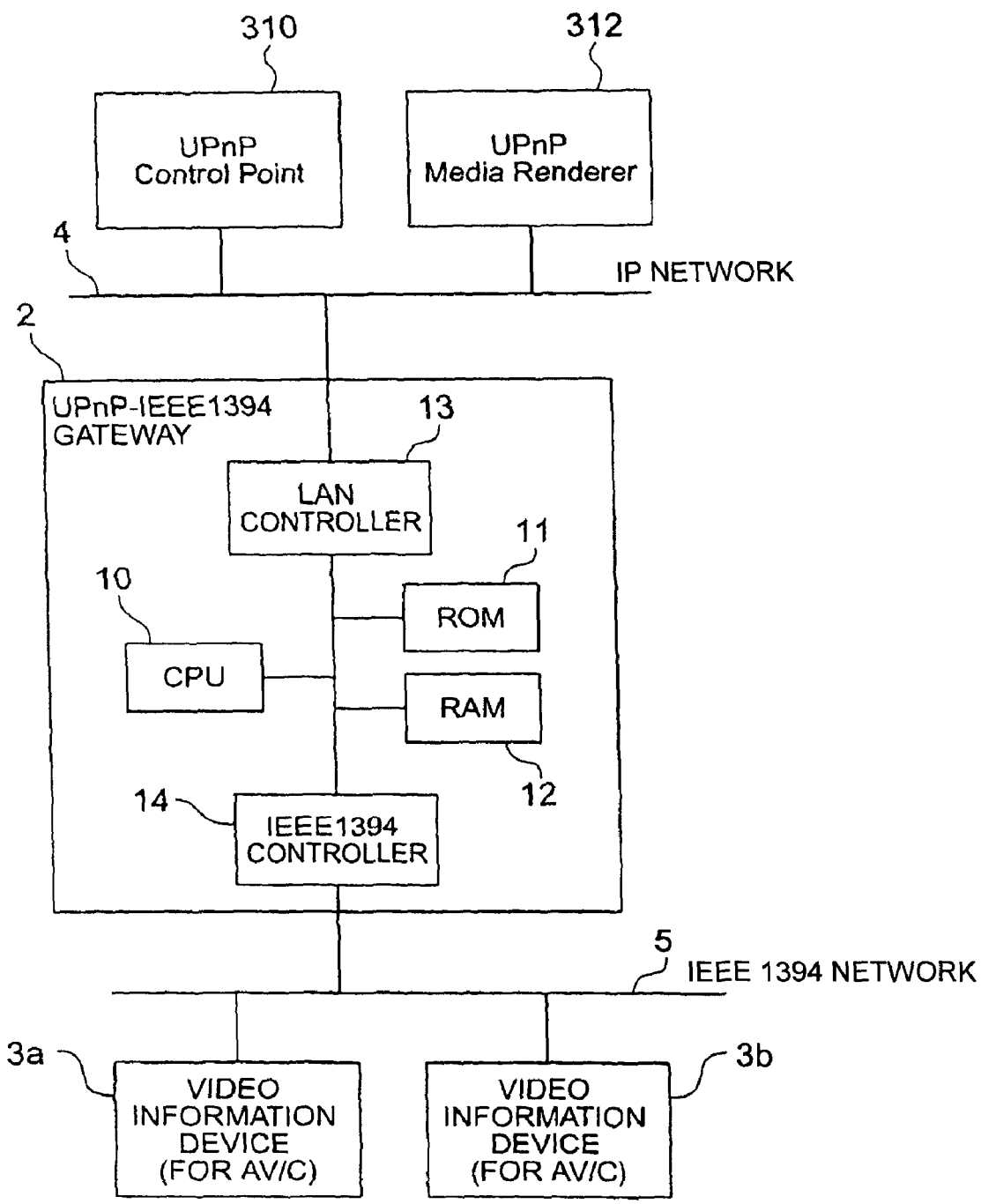
FIG. 1 is a diagram illustrating a configuration of a gateway device according to Embodiment 1 of the present invention.

FIG. 1 is a configuration diagram illustrating a configuration system to which a gateway device according to Embodiment 1 of the present invention is applied.

A UPnP-IEEE1394 gateway 2 as the gateway device according to Embodiment 1 of the present invention includes a CPU 10, a ROM 11 for storing programs, a RAM 12 used for work area and data storage area to execute programs, a LAN controller 13, and an IEEE1394 controller 14.

The CPU 10 can access the ROM 11, the RAM 12, the LAN controller 13, and the IEEE1394 controller 14 through an internal bus or an extension bus such as a PCI. The UPnP-IEEE1394 gateway 2 may additionally include a hard disk (HDD, not shown) as a secondary memory device.

The UPnP-IEEE1394 gateway 2 is connected to an Internet Protocol (IP) network 4 through the LAN controller 13. Because this IP network 4 is not dependent on a physical layer, for a physical layer standard, a wired LAN such as Ethernet (registered trademark) or a wireless LAN such as IEEE802.11a/b/g may be used. In this case, the LAN controller 13 compliant with the physical layer is used.

A UPnP control point 310 corresponding to a standard of Universal Plug and Play (hereinafter, abbreviated as "UPnP") is connected to the IP network 4. The UPnP control point 310 includes a personal computer which has an application installed to realize a function of the UPnP control point 310.

A UPnP media renderer 312 corresponding to the UPnP standard is connected to the IP network 4. The UPnP media renderer 312 is a device which is used for reproducing contents obtained from a home network and which mainly includes functions of displaying a video, reproducing contents such as an audio output, and receiving streaming.

The UPnP-IEEE1394 gateway 2 is connected to an IEEE1394 network 5 via the IEEE1394 controller 14. Video information devices 3a and 3b are connected to the IEEE1394 network 5. In FIG. 1, the two video information devices 3a and 3b are connected thereto. In reality, however, one or a plurality of video information devices 3 can be connected to the IEEE1394 network 5 within the standard of the IEEE1394.

Each of the video information devices 3a and 3b includes a target function of an Audio Video Control (hereinafter, abbreviated as "AV/C") command which is a command system to remote-control devices interconnected via the IEEE1394 network 5. An example thereof is a commercially available digital video camera or D-VHS recorder. FIG. 1 only conceptually shows the IP network 4 and the IEEE1394 network 5, not reflecting an actual physical network topology.

The UPnP-IEEE1394 gateway 2 according to the present invention serves as an intermediary for interconnecting the IP network 4 and the IEEE1394 network 5, and operates the video information devices 3a and 3b having no UPnP functions on the IEEE1394 network 5 from the UPnP control point 310 of the IP network 4.

Figure 2:
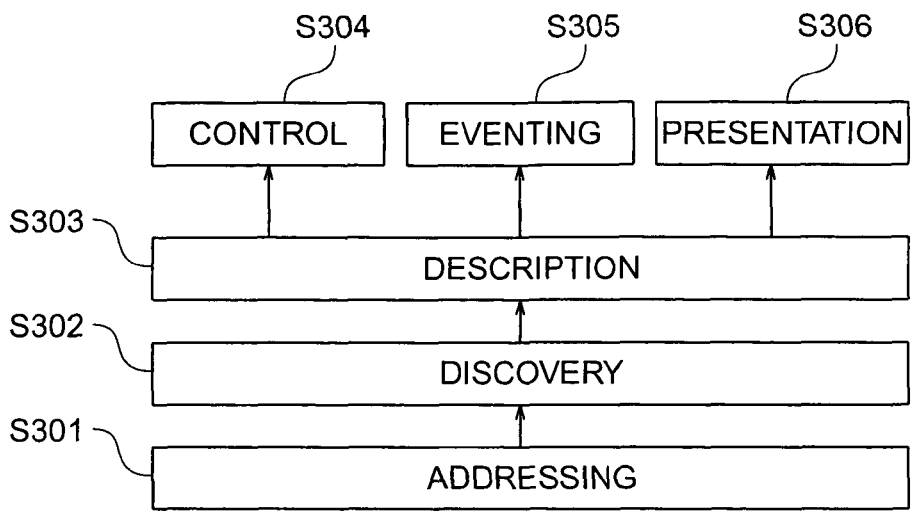
FIG. 2 is a flowchart illustrating operation steps of a UPnP according to Embodiment 1 of the present invention.

FIG. 2 is a flowchart illustrating operation steps of the UPnP. As shown in FIG. 2, the UPnP has six types of operation steps. Addressing S301 is a first operation of the UPnP carried out by a UPnP device participating in the IP network 4 to automatically obtain an IP address. To realize this operation, a Dynamic Host Configuration Protocol (hereinafter, abbreviated as "DHCP") is basically used. When the IP network 4 is not compliant with the DHCP, AutoIP is used. The device that has obtained an IP address in the addressing S301 proceeds to a next step, discovery S302.

The discovery S302 is an operation for detecting a device of the IP network 4. The discovery S302 includes two types of operations, that is, an advertising operation carried out by a newly added device to make an advertisement to the UPnP control point 310, and a searching operation carried out by a newly added UPnP control point 310 to make a request for retrieving a device. Both operations use a Simple Service Discovery Protocol (abbreviated as "SSDP") as means.

In the former operation, the added device multicasts an advertising message for advertising. In the latter operation, the UPnP control point 310 multicasts a message for searching, and the corresponding device returns a search response message to the UPnP control point 310.

Description S303 is an operation for obtaining detailed information from the device detected by the UPnP control point 310. The UPnP control point 310 can obtain information of each device by using a Uniform Resource Locator (hereinafter, abbreviated as "URL") described in an advertising message or a search response message. This device information is described in a format of an eXtensible Markup Language (hereinafter, abbreviated as "XML"), and is a device description containing a model name, a serial number, a manufacturer's name, and service information. The device description contains a URL for obtaining information of services which can be used by the device. The UPnP control point 310 can obtain a service description containing useful actions provided by the services by using the URL. The service description is described in the XML format. Upon completion of the description S303, the UPnP control point 310 knows means for controlling the target device.

Control S304 is an operation of the UPnP control point 310 for actually controlling the device. The UPnP control point 310 makes an action request to the device based on the actions, services, and parameters or arguments of the respective actions. A Simple Object Access Protocol (hereinafter, abbreviated as "SOAP") is used as means for making an action request. The UPnP control point 310 transmits a control command described in the XML format to the device by using the SOAP. The device renders requested services, and returns a result of the action to the UPnP control point 310.

Eventing S305 is an operation carried out by the UPnP control point 310 to detect a status change of the device. The device notifies, when a state variable of its own services changes, the UPnP control point 310 to which the device subscribes of the change. A Generic Event Notification Architecture (hereinafter, abbreviated as "GENA") is used as means for this. A message is described in the XML format.

Presentation S306 is an operation for operating and setting a device by using a web browser. When a target device has a user interface function based on a Hyper Text Markup Language (hereinafter, abbreviated as "HTML"), by accessing a presentation URL contained in a device description, a presentation screen can be displayed by the web browser, and the device can be operated by using the screen.

The UPnP standard defines interfaces and functions to be installed as a Device Control Protocol (hereinafter, abbreviated as "DCP") for a specific device type. A DCP as an AV device is a media server or a media renderer.

Figure 3:
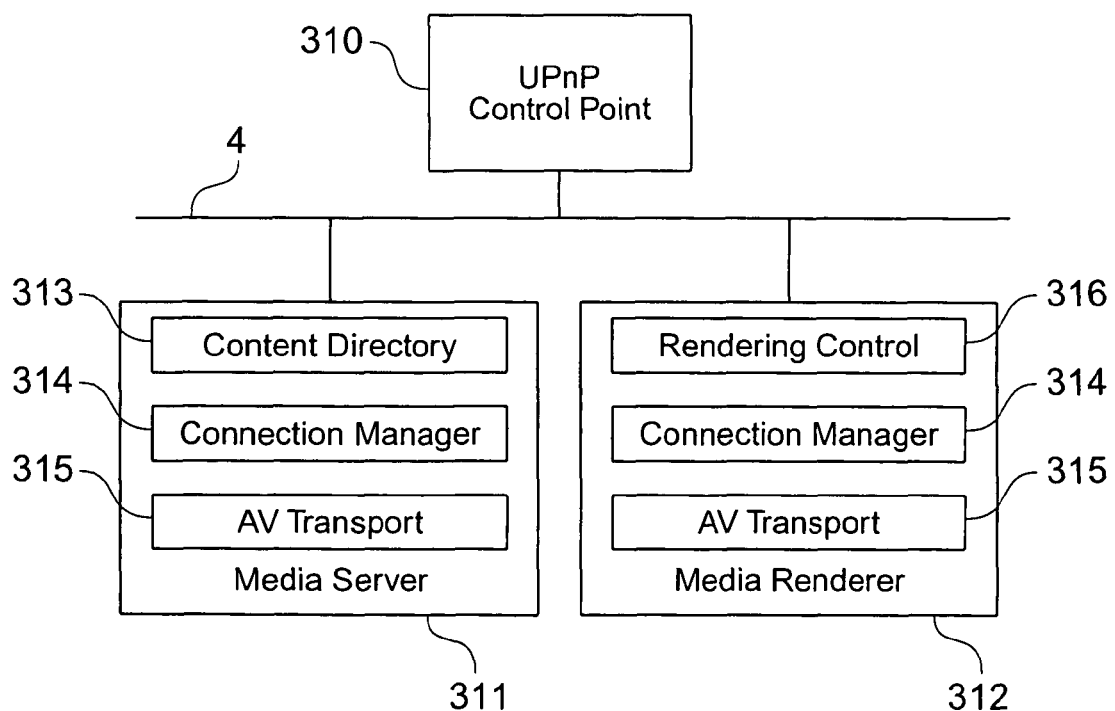
FIG. 3 is a diagram illustrating an architecture of a UPnP AV according to Embodiment 1 of the present invention.

FIG. 3 illustrates a UPnP AV architecture. The UPnP AV architecture employs a model where the UPnP control point 310 controls the media server 311 and the media renderer 312. The media server 311 is a device which is used for searching for useful contents on the home network, and which includes a function of mainly storing contents and sending streaming. For this device, a playback device such as a VTR or a DVD player is assumed. The media server 311 includes a content directory 313, a connection manager 314, and an AV transport 315 as services.

The content directory 313 is a service for providing an action set which enables the UPnP control point 310 to enumerate contents which can be supplied by a server (device including the media server 311, not shown). By using these actions, the UPnP control point 310 can read a content hierarchy and retrieve attributes, obtain metadata of contents of a title, an author, and URL attributes, and perform content operations such as generation or deletion of contents.

The connection manager 314 is a service for providing an action set to manage a connection regarding a specific device. By using these actions, the UPnP control point 310 can enumerate a streaming protocol, a data format, and a current connection situation.

The AV transport 315 is a service for providing an action set which enables the UPnP control point 310 to control playback of contents. By using these actions, the UPnP control point 310 can perform reproduction control for reproduction, stopping or seeking of contents.

The media renderer 312 is a device which is used for reproducing contents obtained through the home network, and which includes a function of mainly displaying a video, reproducing contents such as an audio output, and receiving streaming.

The media renderer 312 includes a rendering control 316, a connection manager 314, and an AV transport 315 as services.

The rendering control 316 is a service for providing an action set which enables the UPnP control point 310 to control how to reproduce contents by a renderer (device including the media renderer 312, not shown). By using these actions, the UPnP control point 310 can control luminance of a video image, contrast, an audio volume, or muting.

Figure 4:
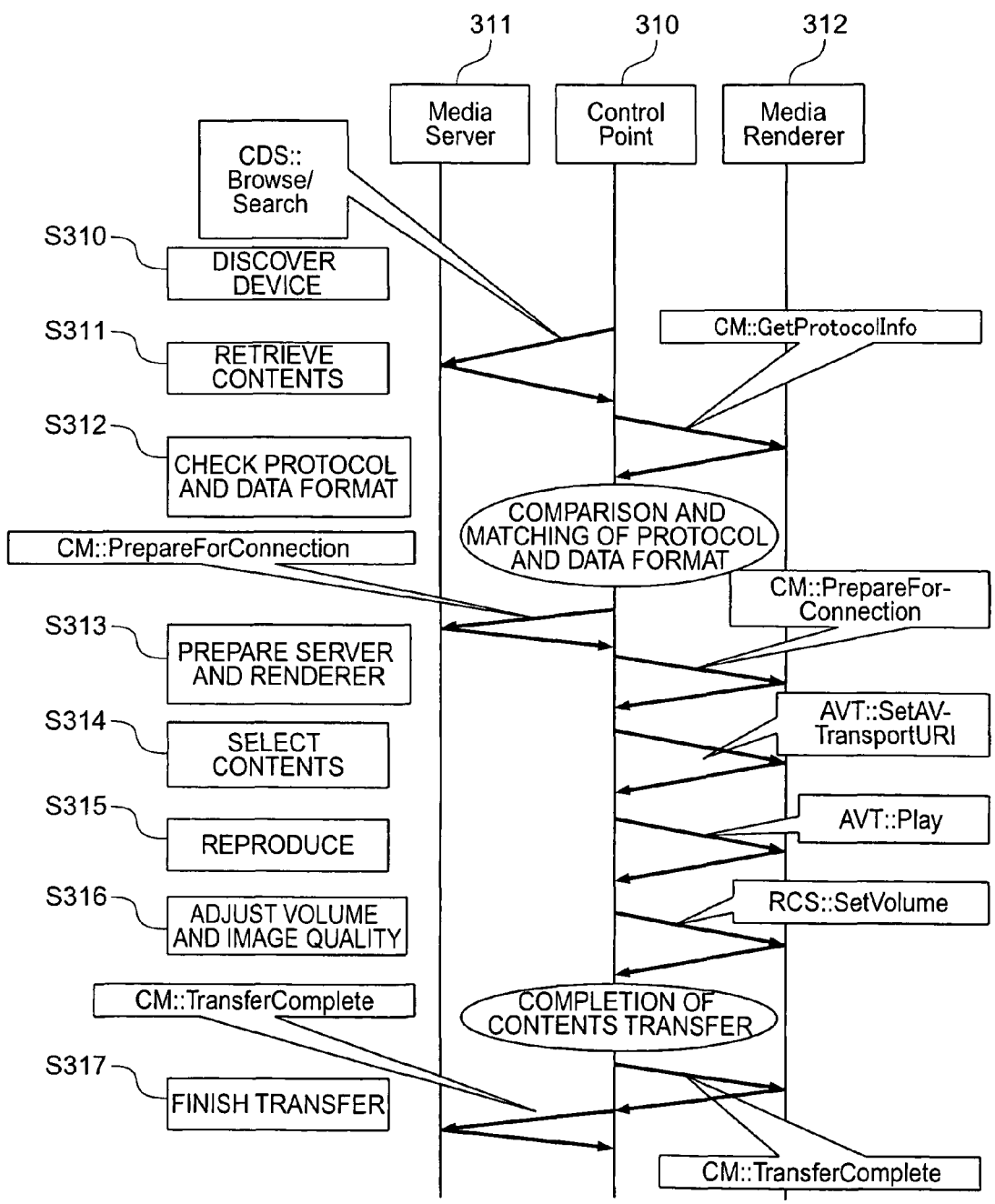
FIG. 4 is a flowchart illustrating a reproduction flow of a pull type which uses the architecture of the UPnP AV according to Embodiment 1 of the present invention.

FIG. 4 illustrates a reproduction flow of a pull type which uses a UPnP AV architecture. In Step S310, a device is discovered. This is carried out by the UPnP discovery S302 and description S303. After completion of Step S310, the UPnP control point 310 can recognize and control the media server 311 and the media renderer 312.

In Step S311, contents are retrieved. In Step S311, the UPnP control point 310 retrieves contents by using the services of the content directory 313 of the Media Sever 311. In this case, the UPnP control point 310 transmits a message of a Browse action or a Search action to the media server 311 through the SOAP communication. As its reply, the media server 311 returns information containing a content hierarchical structure, transfer protocol data, and a data format to the UPnP control point 310.

In Step S312, upon reception of the reply, the UPnP control point 310 obtains information of a transport protocol and a format supported by the media renderer 312 by using the service of the connection manager 314 of the media renderer 312. In this case, the UPnP control point 310 transmits a message of a GetProtocolInfo action to the media renderer 312. The media renderer 312 returns, as its reply, information containing a list of supported transfer protocols and formats to the UPnP control point 310. Then, the UPnP control point 310 compares protocols with data formats based on the information of the transfer protocols and the formats obtained in Step S312 and the information obtained in Step S311 to decide a combination usable for both of the media server 311 and the media renderer 312.

In Step S313, the UPnP control point 310 notifies both of the media server 311 and the media renderer 312 of generation of a connection based on the transfer protocol and the format decided in Step S312 by using the service of the connection manager 314. In this case, the UPnP control point 310 transmits a message of a PrepareForConnection action to the media server 311. The media server 311 does not have to return any information to the UPnP control point 310 as its reply because a case of a pull type is described.

The UPnP control point 310 transmits a message of the PrepareForConnection action to the media renderer 312. The media renderer 312 returns AV transport instance ID or rendering control instance ID to the UPnP control point 310 as its reply.

In Step S314, because the case of the pull type is described, the UPnP control point 310 notifies the media renderer 312 of information on which contents are to be transferred by using the service of the AV transport 315. In this case, the UPnP control point 310 transmits a message of a SetAVTransportURI action to the media renderer 312.

In Step S315, because the case of the pull type is described, the UPnP control point 310 issues a command of actual reproduction control such as Play, Stop or Seek to the media renderer 312 by using the service of the AV transport 315. In this case, the UPnP control point 310 transmits, for example, a message of a Play action to the media renderer 312. The media renderer 312 issues a content transfer request to the media server 311 based on a URL indicating the contents received in Step S314. Contents of the transfer request vary depending on a protocol used for transferring the contents. For example, when an HTTP is used, an HTTP-GET method is used. As a result of the above-mentioned processing, content reproduction is started. In the case of canceling the content reproduction, a Stop action is transmitted.

Step S316 is a volume/image quality adjusting step of adjusting a volume or image quality of the renderer during reproduction. In Step S316, the service of the rendering control 316 is used. In this case, for example, when a volume is adjusted, the UPnP control point 310 transmits a message of a SetVolume action to the media renderer 312, and a volume is changed as a result. After final completion of the content transfer, the process proceeds to a transfer completion Step S317.

Step S317 is a transfer end step carried out after final completion of the content transfer. In this step, the UPnP control point 310 carries out end processing of connection between the media server 311 and the media renderer 312 by using the service of the connection manager 314. In this case, the UPnP control point 310 transmits a message of a ConnectionComplete action to the media renderer 312. Then, the UPnP control point 310 similarly transmits the message of the ConnectionComplete action to the media server 311.

Thus, the series of reproduction operations of the pull type using the UPnP AV architecture is completed.

Next, exchange of an AV/C command between devices interconnected via the IEEE1394 is described. The AV/C command is a command system for remote-controlling the devices interconnected via the IEEE1394. The device that performs control is called a controller 20, while the device that is controlled is called a target 21. Each of FIGS. 5 and 6 illustrates a concept of exchange of the AV/C command between the controller 20 and the target 21.

The exchange of the AV/C command is carried out by using a Function Control Protocol (hereinafter, abbreviated as "FCP") defined in IEC61883-1.

Figure 5:
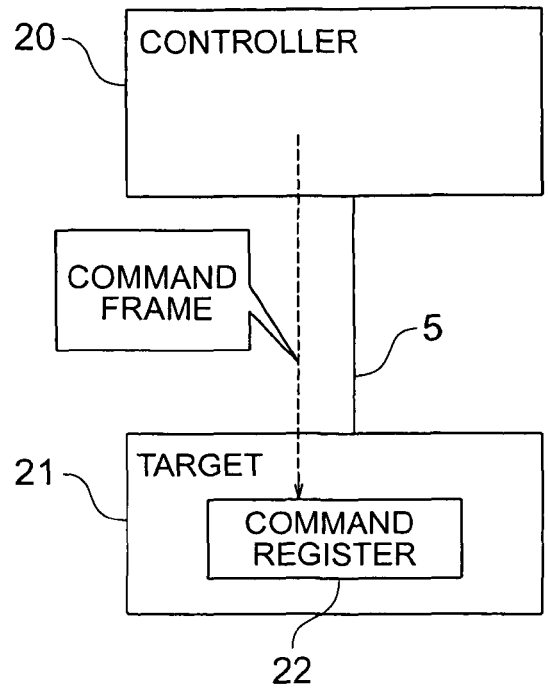
FIG. 5 is a diagram illustrating a command transmission method of an IEEE1394 device according to Embodiment 1 of the present invention.

In the case of issuing a control command from the controller 20 to the target 21, as shown in FIG. 5, the controller 20 writes a command frame compliant with an FCP frame format by issuing a write transaction through an asynchronous transfer which is an asynchronous transfer of the IEEE1394 to a command register 22 incorporated in the target 21. As a result, the target 21 can receive the AV/C command sent from the controller 20, and performs an operation according to the command.

Figure 6:
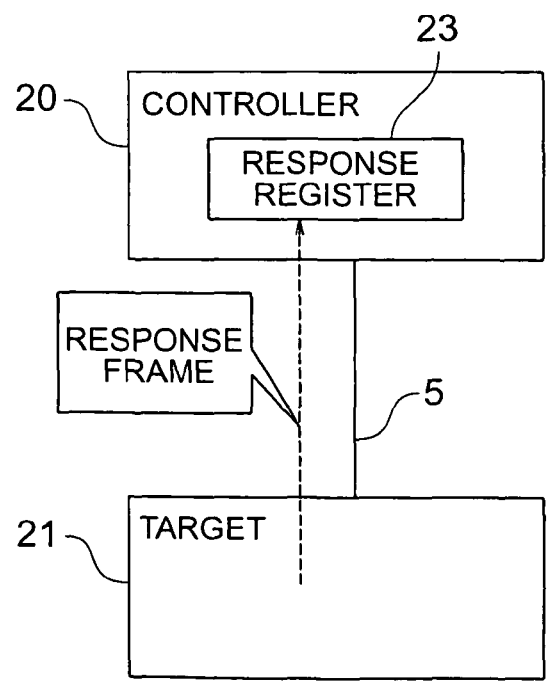
FIG. 6 is a diagram illustrating a response reception method of the IEEE1394 device according to Embodiment 1 of the present invention.

Conversely, in the case of returning a response to notify a result of an operation from the target 21 to the controller 20, as shown in FIG. 6, by similarly issuing a write transaction through the asynchronous transfer to a response register 23 incorporated in the controller 20, a response frame compliant with an FCP frame format is written.

Figure 7:
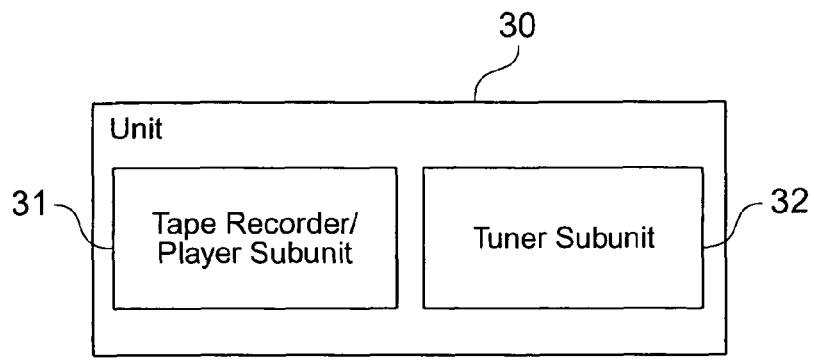
FIG. 7 is a diagram illustrating a concept of an AV/C unit and a subunit according to the present invention.

FIG. 7 is a diagram illustrating a model of a video recorder modeled in the AV/C command.

In the AV/C command, a unit/subunit concept is used to model an AV device. A unit represents an AV device itself. One AV device corresponds to one AV/C unit. A subunit is obtained by modeling a function of an AV device. For example, a subunit corresponding to a function of recording/reproducing in a tape is defined as a tape recorder/player subunit. A subunit corresponding to a function of receiving a broadcast is defined as a tuner subunit.

In the case of a video recorder incorporating a tuner, as shown in FIG. 7, a unit 30 may be expressed while including a tape recorder/player subunit 31 and a tuner subunit 32. Because these subunits are configured by modeling functions, an AV/C command is defined according to a function for each subunit. For example, in the case of playing a tape in the video recorder shown in FIG. 7, a play command contained in the tape recorder/player subunit 31 is used.

Next, a procedure where the UPnP-IEEE1394 gateway 2 operates as a delegation server between the IP network 4 and the IEEE1394 network 5, and the video information devices 3a and 3b connected to the IEEE1394 network having no UPnP function are operated from the UPnP control point 310 on the IP network 4 to watch and hear contents of the video information devices 3a and 3b transmitted via the IEEE1394 network 5 at a PC on the IP network 4 is described.

Figure 8:
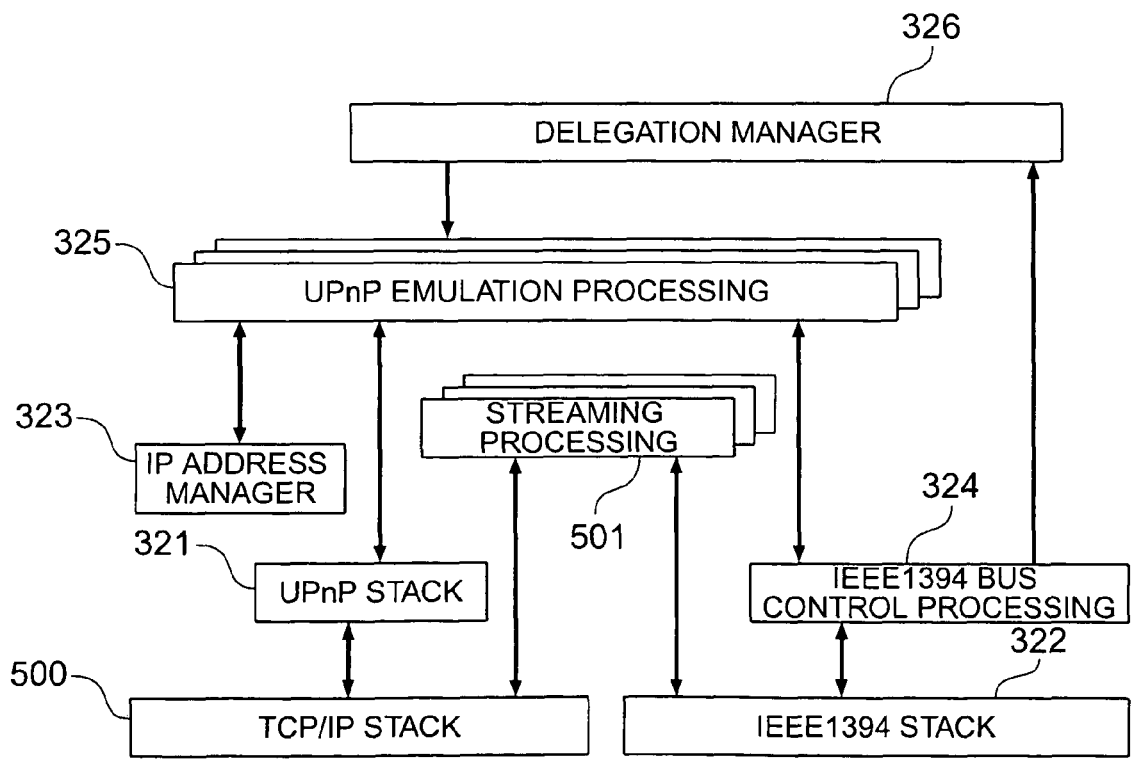
FIG. 8 is a diagram illustrating a software configuration of the gateway device according to Embodiment 1 of the present invention.

FIG. 8 illustrates an example of a software configuration for operating the UPnP-IEEE1394 gateway 2 as a delegation server.

A UPnP stack 321 is a software group for performing UPnP processing, and generally includes an HTTP server for processing a standard HTTP GET request, an HTTP parser for interpreting a header of an HTTP message, an XML parser, a module group for processing the SOAP, the GENA protocol, and an SSDP. The UPnP stack 321 is configured as an upper layer of a TCP/IP stack 500.

An IEEE1394 stack 322 is a software group for processing an IEEE1394 transaction, an AV protocol such as an FCP, or an IEEE1394 related protocol such as an AV/C command.

A delegation manager 326 is software having functions of starting, when IEEE1394 devices (e.g., corresponding to video information devices 3a and 3b) are connected to the IEEE1394 network 5, UPnP emulation processing 325 based on obtained IEEE1394 device information, and finishing, when the IEEE1394 devices are cut off from the IEEE1394 network 5, the UPnP emulation processing 325 started for the devices.

The UPnP emulation processing 325 is software which is started from the delegation manager 326 as an independent process corresponding to each IEEE1394 device connected to the IEEE1394 network 5 and which has a function of executing each step of the UPnP in place of the device to operate the IEEE1394 device as one UPnP device. For this software, the processes are started by the same number as the number of IEEE1394 devices connected to the IEEE1394 network 5.

IEEE1394 bus control processing 324 is software having functions of monitoring a status of the IEEE1394 device to notify the delegation manager 326 of information regarding connection/disconnection of the IEEE1394 device, and transferring AV/C command data received from the IEEE1394 device to the UPnP emulation processing 325 or, conversely, transmitting AV/C command data received from the UPnP emulation processing 325 to the IEEE1394 device.

An IP address manager 323 is software having a function of allocating an IP address to each IEEE1394 device emulated by the UPnP emulation processing 325.

Streaming processing 501 is software having a function of transmitting video streaming data received via the IEEE1394 stack 322 to the IP network 4 via the TCP/IP stack 500.

Figure 9:
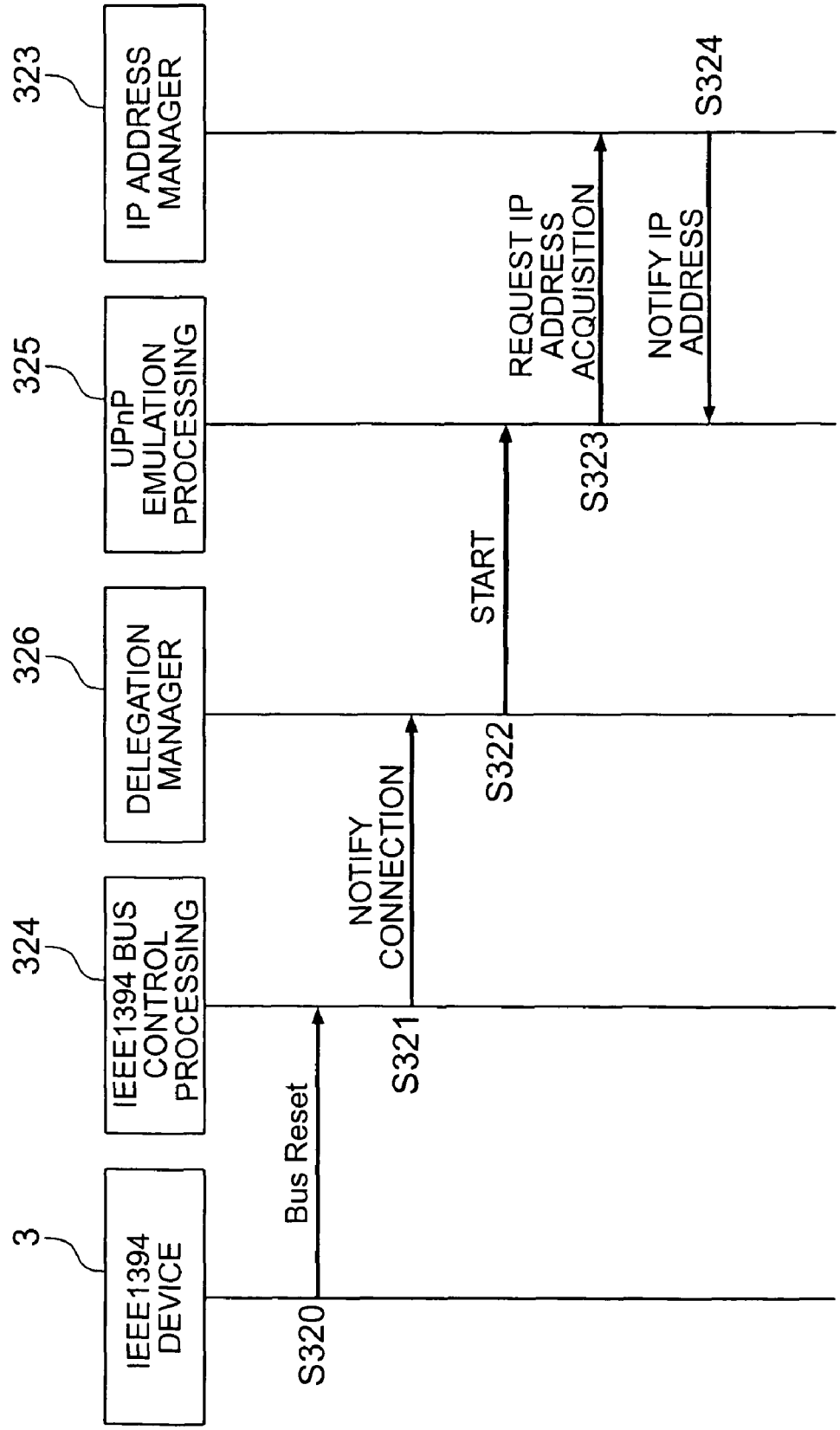
FIG. 9 is a diagram illustrating a software operation sequence during addressing of the gateway device according to Embodiment 1 of the present invention.

Next, a software operation of the UPnP-IEEE1394 gateway 2 in the UPnP addressing S301 is described. FIG. 9 illustrates an operation sequence of the addressing S301.

In Step S320, when power of the IEEE1394 device 3 is turned on, or the IEEE1394 device 3 is newly connected to the IEEE1394 network 5, bus reset occurs, and this is detected by the IEEE1394 bus control processing 324.

In Step S321, upon detection, the IEEE1394 bus control processing 324 notifies the delegation manager 326 of the new connection of the IEEE1394 device 3 to the IEEE1394 network 5.

In Step S322, upon reception of the notification, the delegation manager 326 starts the UPnP emulation processing 325. The UPnP emulation processing 325 started here always corresponds, in all UPnP steps thereafter, to the IEEE1394 device 3 which is a source of notification. When a plurality of IEEE1394 devices 3 are connected to the IEEE1394 network 5, UPnP emulation processing 325 corresponding one-to-one to each IEEE1394 device 3 is started.

In Step S323, the started UPnP emulation processing 325 issues an IP address acquisition request to the IP address manager 323.

In Step S324, the IP address manager 323 selects an IP address to be virtually allocated to the IEEE1394 device 3, and notifies the UPnP emulation processing 325 of the decided IP address. For IP address selection, a method of allocating addresses defined in a table as in the case of the DHCP, or an AutoIP method should be used.

Figure 10:
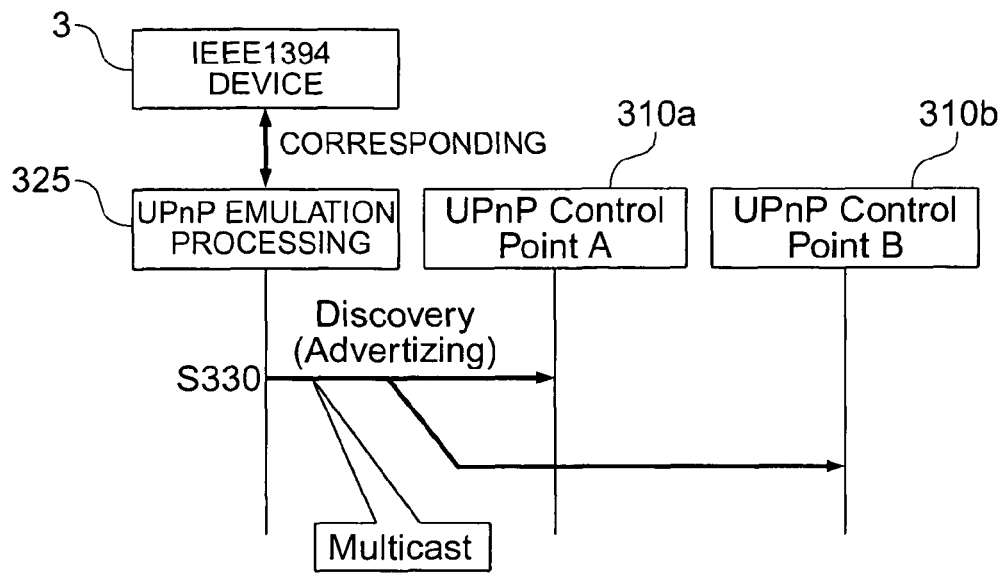
FIG. 10 is a diagram illustrating a software operation sequence in an advertising operation during discovery of the gateway device according to Embodiment 1 of the present invention.

Next, a software operation of the UPnP-IEEE1394 gateway 2 when the advertising operation of the discovery S302 of the UPnP is carried out is described. FIG. 10 illustrates a sequence when the newly added device carries out an advertising operation for the UPnP Control Operation 310 in the discovery S302. This example shows a case where two UPnP control points 310a and 310b are present on the IP network 4.

In Step S330, UPnP emulation processing 325 corresponding to a specific IEEE1394 device 3 multicasts a Discovery message of Advertizing on the IP network 4 by using the SSDP. Upon reception of this message, the UPnP control points 310a and 310b recognize the IEEE1394 device 3 as a UPnP device.

Figure 11:
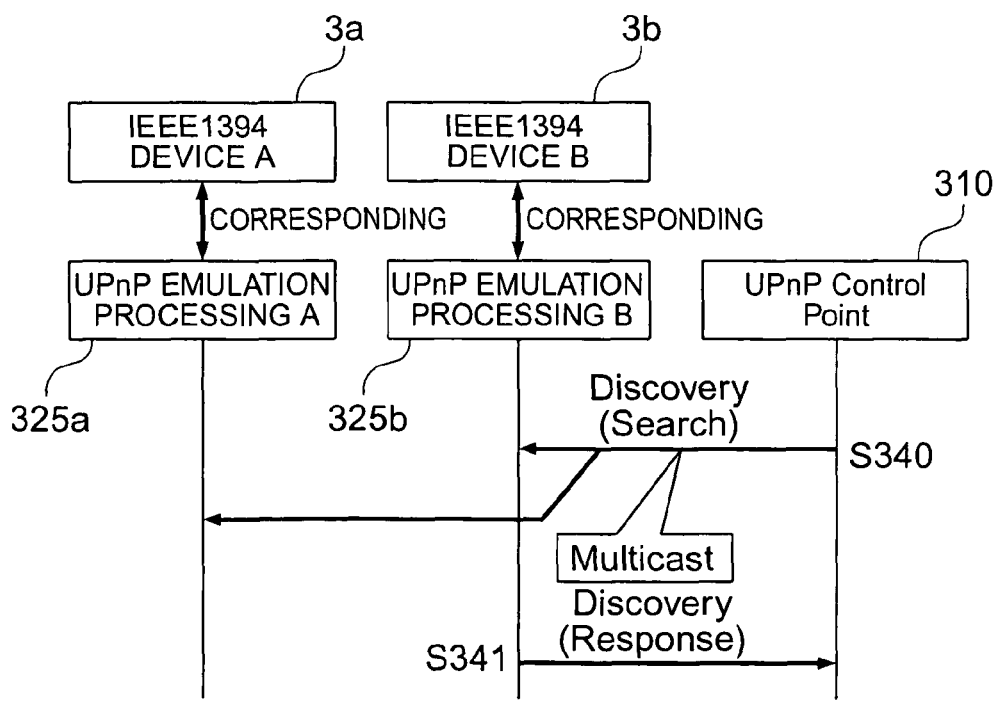
FIG. 11 is a diagram illustrating a software operation sequence in a searching operation during the discovery of the gateway device according to Embodiment 1 of the present invention.

Next, a software operation of the UPnP-IEEE1394 gateway 2 when a searching operation of the discovery S302 of the UPnP is carried out is described. FIG. 11 illustrates a sequence of a searching operation where the newly added UPnP control point 310 makes a request to retrieve a device in the discovery S302. This example shows a case where two IEEE1394 devices 3 are present on the IEEE1394 network 5.

In Step S340, the UPnP control point 310 multicasts a Discovery message of Search on the IP network 4 by using an SSDP. This message is received by UPnP emulation processing 325a corresponding to the IEEE1394 device 3a and UPnP emulation processing 325b corresponding to the IEEE1394 device 3b.

In Step S341, the UPnP emulation processing 325b corresponding to the IEEE1394 device 3b having a function corresponding to a service or a device indicated by a condition of the Discovery message of Search transmits a Discovery message of Response to the UPnP control point 310. As a result, the UPnP control point 310 recognizes the IEEE1394 device 3b as a UPnP device which it has searched for by itself.

Next, a software operation of the UPnP-IEEE1394 gateway 2 when the description S303 of the UPnP is carried out is described.

Figure 12:
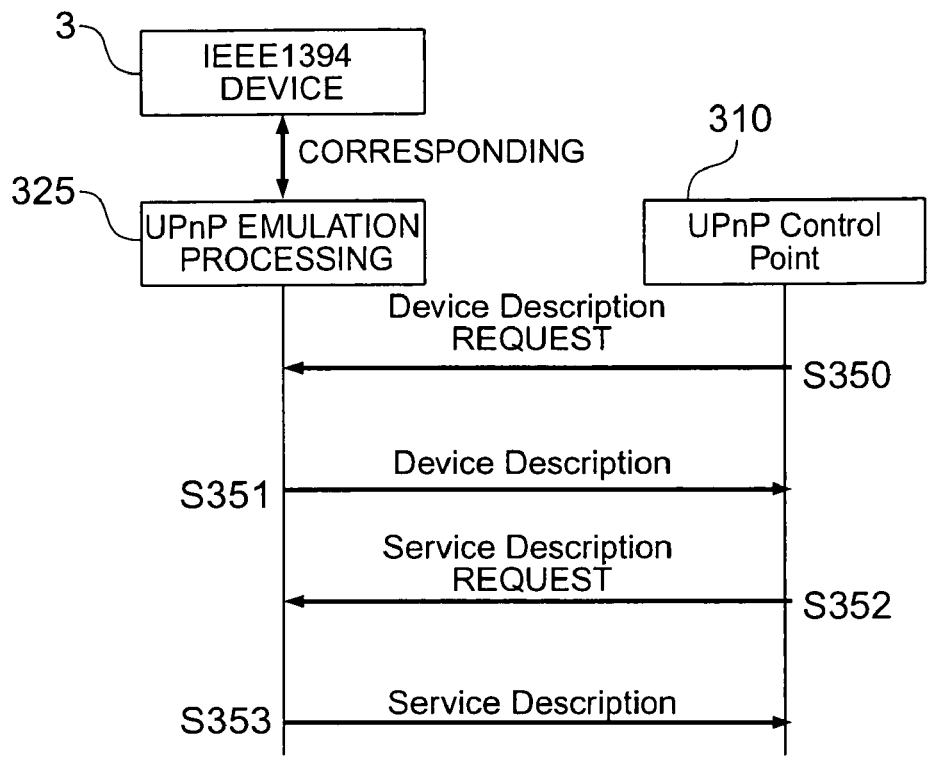
FIG. 12 is a diagram illustrating a software operation sequence during description of the gateway device according to Embodiment 1 of the present invention.

FIG. 12 illustrates a sequence when an operation of the description S303 of the UPnP is carried out.

In Step S350, the UPnP control point 310 issues a device description request to UPnP emulation processing 325 corresponding to the IEEE1394 device 3 by using a URL described in an advertising message or a search response message. A protocol used in this case is an HTTP.

In Step S351, the UPnP emulation processing 325 generates device information regarding the IEEE1394 device 3 as a device description in the XML format, and transmits this information to the UPnP control point 310.

In Step S352, when a service list of the device description contains a URL to obtain a service description, the UPnP control point 310 issues a request of service description to the UPnP emulation processing 325.

In Step S353, the UPnP emulation processing 325 generates service information regarding the IEEE1394 device 3 as a service description in the XML format in response to the request of service description, and transmits this information to the UPnP control point 310.

In the case of a general UPnP device, upon completion of the description step, the UPnP control point 310 is permitted to control the device.

Next, an actual software operation shown in FIG. 8 in each step of a content reproduction flow shown in FIG. 4 is described.

First, a software operation in content retrieval S311 is described. The description is directed to an example of a D-VHS recorder/player including a tape recorder/player subunit 31 as the IEEE1394 device 3. For a protocol used for transferring stream data, an HTTP is taken as an example.

Figure 13:
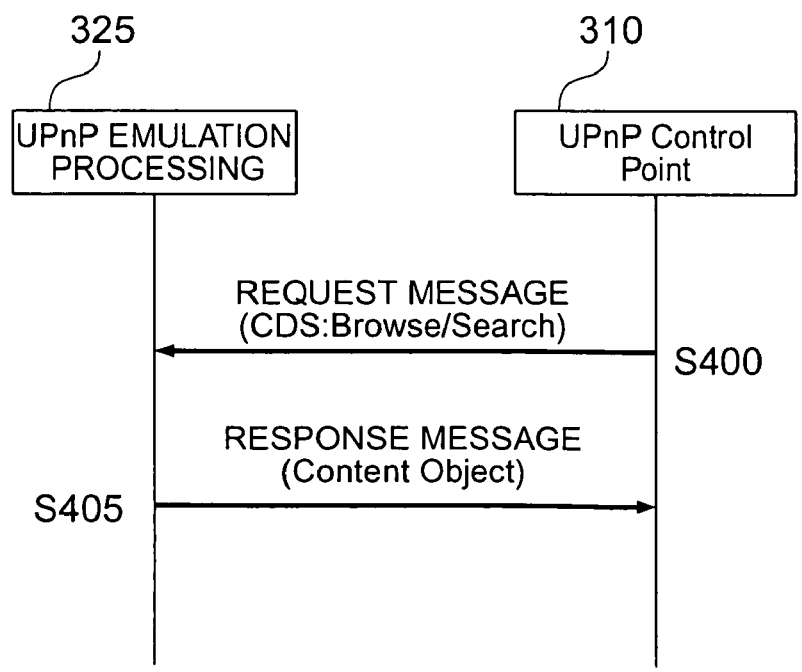
FIG. 13 is a diagram illustrating a software operation sequence during content retrieval of the gateway device according to Embodiment 1 of the present invention.

FIG. 13 is a diagram illustrating a sequence of software operations in the content retrieval S311.

In Step S400, the UPnP control point 310 transmits a message containing a "Browse" or "Search" action request to the UPnP emulation processing 325 by using the SOAP.

In Step S405, the UPnP emulation processing 325 which has already been started corresponding to the IEEE1394 device 3 receives the transmitted message via a UPnP stack 321. Because the D-VHS recorder/player cannot read a content list, the UPnP emulation processing 325 that has received the message regards a tape as one large content to generate data of a "Browse" or "Search" response, and transmits the data to the UPnP control point 310 via the UPnP stack 321.

Through this step, the UPnP control point 310 recognizes a content hierarchical structure, transfer protocol data, and data format information of the IEEE1394 device 3. In this case, the transfer protocol data is not for a protocol which enables the IEEE1394 device 3 to transmit data via the IEEE1394 network 5 but for a protocol which enables the UPnP-IEEE1394 gateway 2 to transmit data to the IP network 4. In this example, the protocol is an HTTP. Similarly, the data format information is not for a format when the IEEE1394 device 3 transmits data via the IEEE1394 network 5 but for a format when the UPnP-IEEE1394 gateway 2 transmits data to the IP network 4.

Next, a software operation in protocol and data format check S312 is described.

This step is executed for the media renderer 312, and unrelated to the operation of the UPnP-IEEE1394 gateway 2. This step is carried out, as normal UPnP AV processing, between the UPnP control point 310 and the media renderer 312.

Figure 14:
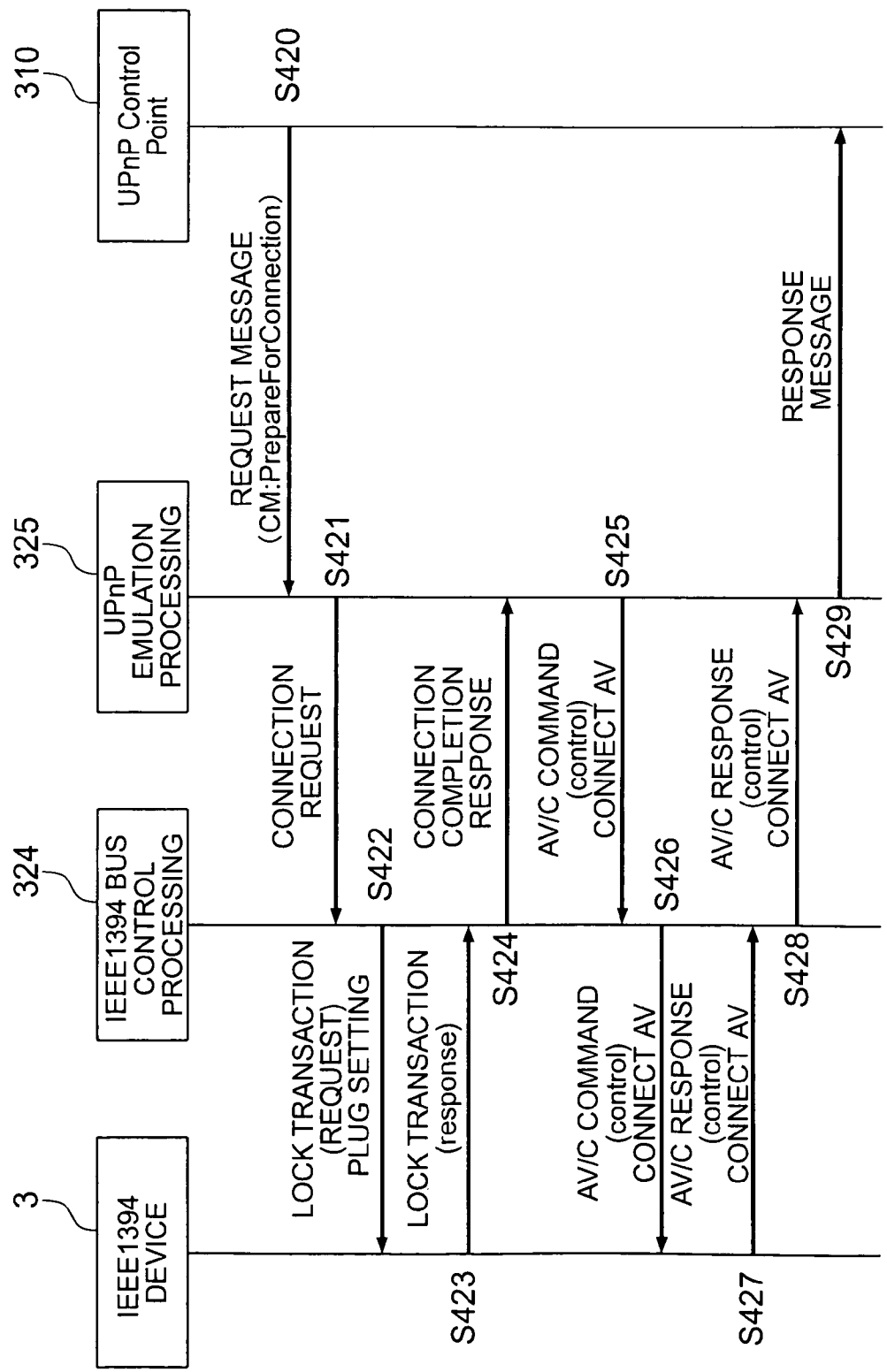
FIG. 14 is a diagram illustrating a software operation sequence during preparation of a server and a renderer of the gateway device according to Embodiment 1 of the present invention.

Next, a software operation in server and renderer preparation S313 is described. FIG. 14 is a diagram illustrating a sequence of software operations in the server and renderer preparation S313.

First, in Step S420, the UPnP control point 310 transmits a message containing a "PrepareForConnection" action to the UPnP emulation processing 325 by using the SOAP. The UPnP emulation processing 325 which has already been started corresponding to the IEEE1394 device 3 receives the transmitted message via the UPnP stack 321.

In Step S421, the UPnP emulation processing 325 that has received the message issues a connection request to the IEEE1394 bus control processing 324.

In Step S422, the IEEE1394 bus control processing 324 transmits a plug setting request by a lock transaction to the IEEE1394 device 3 via the IEEE1394 stack 322. Upon reception of the lock transaction, the IEEE1394 device 3 generates a physical connection.

In Step S423, the IEEE1394 device 3 transmits, after the connection generation, a plug setting result by the lock transaction to the IEEE1394 bus control processing 324 via the IEEE1394 stack 322.

In Step S424, the IEEE1394 bus control processing 324 transmits a connection completion response to the UPnP emulation processing 325 which is a transmission source of the AV/C command.

In Step S425, the UPnP emulation processing 325 that has received the connection completion response converts the "PrepareForConnection" action which is a UPnP service into "CONNECT AV" of the AV/C command by using a correspondence table of UPnP services and AV/C commands to transmit it to the IEEE1394 bus control processing 324.

In Step S426, the IEEE1394 bus control processing 324 transmits the "CONNECT AV" to the IEEE1394 device 3 via the IEEE1394 stack 322.

In Step S427, the IEEE1394 device 3 that has received this AV/C command actually generates a connection which enables transmission/reception of data between itself and the other device, and then returns an AV/C response containing a result of the generation to the IEEE1394 bus control processing 324 via the IEEE1394 stack 322.

In Step S428, the IEEE1394 bus control processing 324 transmits the received AV/C response to the UPnP emulation processing 325 which is a transmission source of the AV/C command.

In Step S429, the UPnP emulation processing 325 converts the AV/C response into a UPnP response message by using a correspondence table of UPnP services and AV/C responses to transmit it to the UPnP control point 310 via the UPnP stack 321. Thus, contents can be transmitted to/received from the IEEE1394 device 3.

Next, a software operation in content selection S314 is described.

This step is executed for the media renderer 312, and has no relation to the operation of the UPnP-IEEE1394 gateway 2. The step is carried out, as normal UPnP AV processing, between the UPnP control point 310 and the media renderer 312. In a SetAVTransportURI action of this case, a URI of contents passed to the media renderer 312 is a URL of contents using the HTTP which the UPnP emulation processing 325 has transmitted to the UPnP control point 310 in Step S311.

Figure 15:
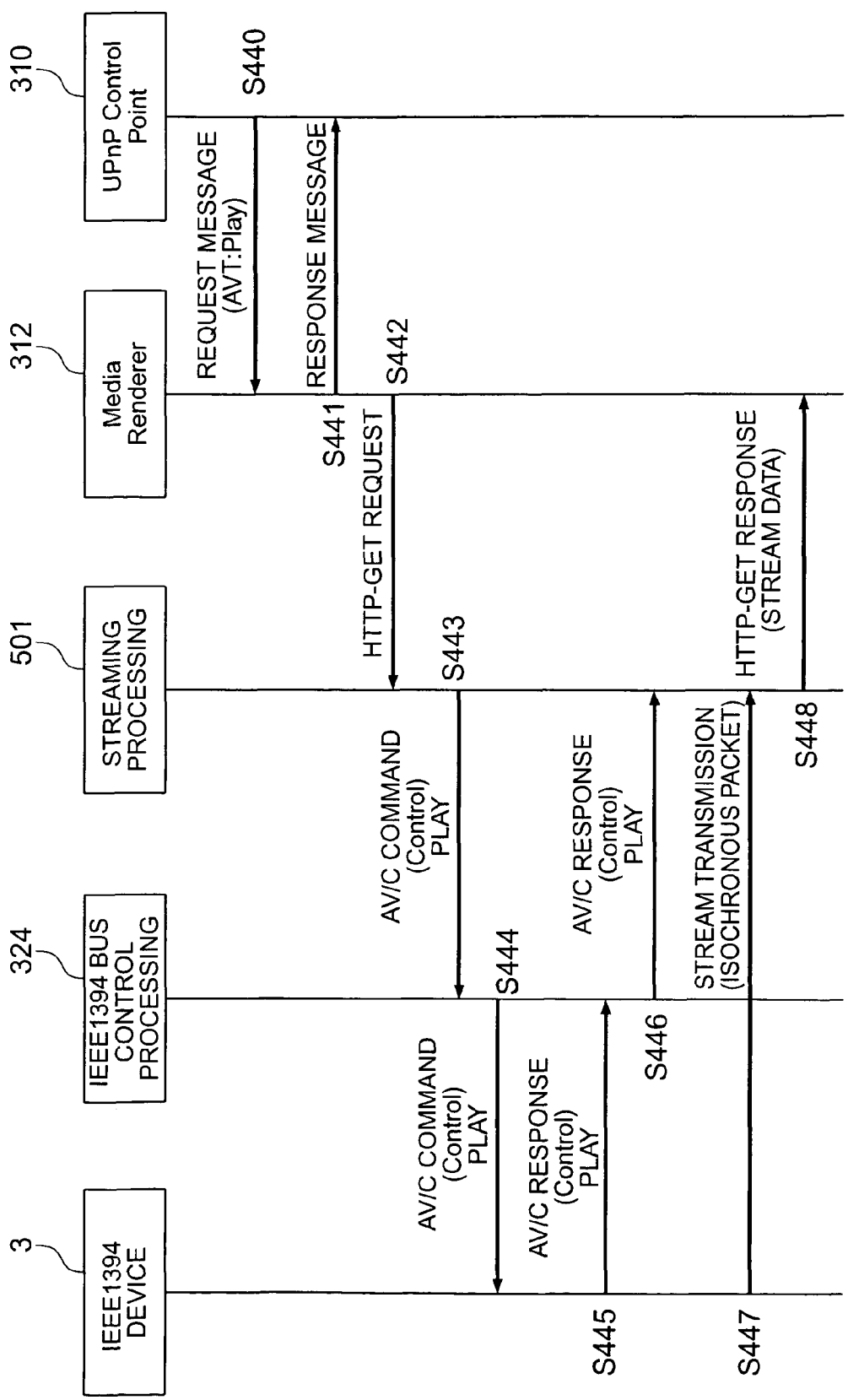
FIG. 15 is a diagram illustrating a software operation sequence during stream reproduction of the gateway device according to Embodiment 1 of the present invention.

Next, a software operation in reproduction S315 is described. FIG. 15 is a diagram illustrating a sequence of software operations in the reproduction S315.

In Step S440, the UPnP control point 310 transmits a message containing a "Play" action request to the media renderer 312 by using the SOAP.

In Step S441, the media renderer 312 returns a response message to notify the UPnP control point 310 of the reception of the "Play" action request.

In Step S442, the media renderer 312 subsequently transmits a content acquisition request to the UPnP-IEEE1394 gateway 2 by using an HTTP GET method. The streaming processing 501 of the UPnP-IEEE1394 gateway 2 receives the HTTP GET method.

In Step S443, the streaming processing 501 that has received the message transmits "PLAY" of the AV/C command as a playback mode "FORWARD" to the IEEE1394 bus control processing 324.

In Step S444, the IEEE1394 bus control processing 324 transmits the AV/C command "PLAY" as the playback mode "FORWARD" to the IEEE1394 device 3 via the IEEE1394 stack 322.

In Step S445, the IEEE1394 device 3 that has received the AV/C command "PLAY" executes reproduction start processing, and then returns an AV/C response containing information of the content reproduction start to the IEEE1394 bus control processing 324 via the IEEE1394 stack 322.

In Step S446, the IEEE1394 bus control processing 324 transmits the received AV/C response to the streaming processing 501 which is a transmission source of the AV/C command.

In Step S447, the IEEE1394 device 3 puts content stream data in an IEEE1394 isochronous packet to transmit it to the streaming processing 501 in a format of MPEG2-TS or the like. The streaming processing 501 receives the isochronous packet.

In Step S448, the streaming processing 501 takes out the data in the stream format of the MPEG2-TS or the like from this packet, and converts the data into a format of an HTTP GET method response to transmit it to the media renderer 312. In this case, in order to adjust timings of isochronous transfer which is synchronous transfer and HTTP transfer which is asynchronous, the optional amount of stream data taken out from the isochronous packet has to be stored in a buffer memory area constituted in the RAM 12.

The media renderer 312 takes out the stream data from the received HTTP GET method response, and executes demultiplexing and decoding to start content reproduction. When a streaming source is a tape medium such as a DVHS, an accurate size of contents is not known before completion of the reproduction. Thus, in this case, advisably, chunked transfer encoding is used by making transfer-encoding in the HTTP GET method response chunked.

When the stream reproduction is interrupted by transmission of a message containing a "Stop" action request from the UPnP control point 310 to the media renderer 312, the media renderer 312 cuts off a TCP connection of the UPnP-IEEE1394 gateway 2 to the streaming processing 501. Thus, the streaming processing 501 has to stop the reproduction of the IEEE1394 device by transmitting an AV/C command "WIND" as a subfunction "STOP" to the IEEE1394 device 3 via the IEEE1394 bus control processing 324.

Next, a software operation in volume/image quality adjustment S316 is described.

This step is executed for the media renderer 312, and has no relation to the operation of the UPnP-IEEE1394 gateway 2. The step is carried out, as normal UPnP AV processing, between the UPnP control point 310 and the media renderer 312.

Figure 16:
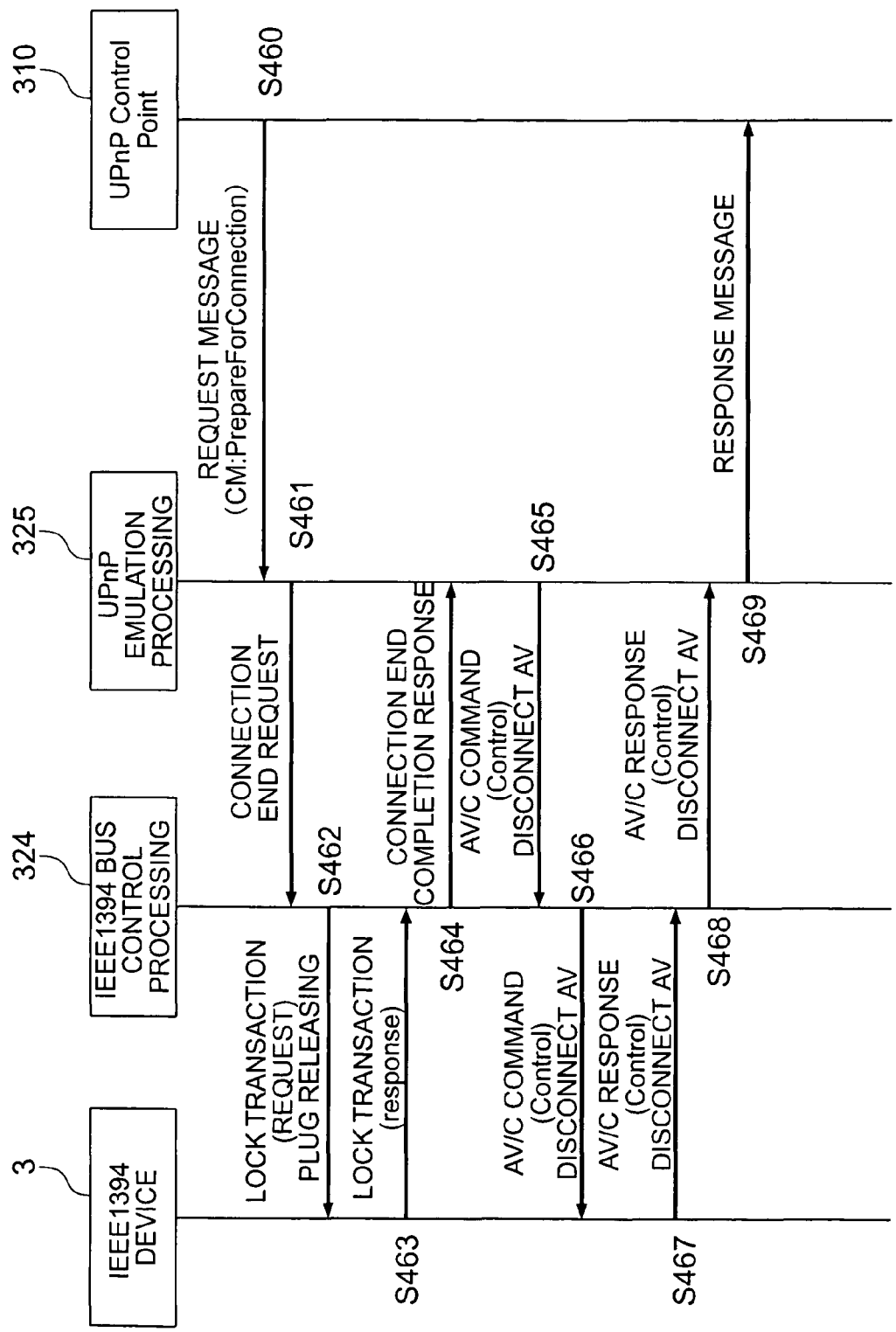
FIG. 16 is a diagram illustrating a software operation sequence at the end time of stream transfer of the gateway device according to Embodiment 1 of the present invention.

Lastly, a software operation in transfer end S317 is described. FIG. 16 is a diagram illustrating a sequence of software operations in the transfer end S317.

First, in Step S460, the UPnP control point 310 transmits a message containing a "TransferComplete" action request to the UPnP emulation processing 325 by using the SOAP. The UPnP emulation processing 325 that has already been started corresponding to the IEEE1394 device 3 receives the transmitted message via the UPnP stack 321.

In Step S461, the UPnP emulation processing 325 that has received the message converts the "TransferComplete" action which is a UPnP service into an AV/C command "DISCONNECT AV" by using the correspondence table of UPnP services and AV/C commands to transmit it to the IEEE1394 bus control processing 324.

In Step S462, the IEEE1394 bus control processing 324 transmits the AV/C command "DISCONNECT AV" to the IEEE1394 device 3 via the IEEE1394 stack. Upon reception of this AV/C command, the IEEE1394 device 3 releases its own connection.

In Step S463, the IEEE1394 device 3 returns an AV/C response containing information of the released connection to the IEEE1394 bus control processing 324 via the IEEE1394 stack 322.

In Step S464, the IEEE1394 bus control processing 324 transmits the received AV/C response to the UPnP emulation processing 325 which is a transmission source of the AV/C command.

In Step S465, in order to further release a physical connection, the UPnP emulation processing 325 that has received the released connection response transmits a connection end request to the IEEE1394 bus control processing 324.

In Step S466, upon reception of the connection end request, the IEEE1394 bus control processing 324 transmits a plug release request by the lock transaction to the IEEE1394 device 3 via the IEEE1394 stack 322. The IEEE1394 device 3 that has received this message releases a physical connection.

In Step S467, subsequently, the IEEE1394 device 3 returns a lock transaction auto containing information of the released physical connection to the IEEE1394 bus control processing 324 via the IEEE1394 stack 322.

In Step S468, the IEEE1394 bus control processing 324 transmits the received AV/C response to the UPnP emulation processing 325 which is a transmission source of the AV/C command.

In Step S469, the UPnP emulation processing 325 converts the AV/C response into a UPnP response message by using the correspondence table of UPnP services and AV/C responses to transmit it to the UPnP control point 310 via the UPnP stack 321. Accordingly, the UPnP control point 310 can recognize the releasing of the connection of the IEEE1394 device 3.

According to this gateway device, the UPnP control point 310 of the IP network 4 operates the IEEE1394 device 3 of the IEEE1394 network 5 which has no UPnP function, and the video information device connected to the IEEE1394 network 5 to reproduce the stream data transmitted by the IEEE1394 device 3 via the IEEE1394 network by a media player having a UPnP media renderer device function of the IP network is automatically detected and operated by the player device such as a personal computer connected to the IP network 4. Thus, contents of an audio/video stored in the video information device can be watched and heard by the player device connected to the IP network 4.

Moreover, there is an effect that the video information device connected to the IEEE1394 network 5 is recognized as a UPnP AV device compliant with the standard. Thus, contents of an audio/video stored in the video information device compliant with the UPnP AV can be watched and heard by the player device.

Embodiment 2

Embodiment 1 described above has been described by way of the case where the HTTP is used as an IP stream transfer protocol. A Realtime Transport Protocol (hereinafter, abbreviated as "RTP") can be used instead. According to Embodiment 2, a Realtime Streaming Protocol (hereinafter, abbreviated as "RTSP") is used as a session control protocol used when stream data is transferred by using the RTP. Only portions different from the case of the HTTP are described below.

First, in the content retrieval S311, among data of a "Browse" or "Search" response which the UPnP emulation processing 325 transmits to the UPnP control point 310 in Step S405 of FIG. 13, transfer protocol data is RTSP/RTP.

A URI passed to the media renderer 312 in, among the software operations of the content selection S314, the Set-AVTransportURI action executed from the UPnP control point 310 to the media renderer 312, is a URL of contents using the RTSP/RTP transmitted to the UPnP control point 310 by the UPnP emulation processing 325 in Step S311.

Figure 17:
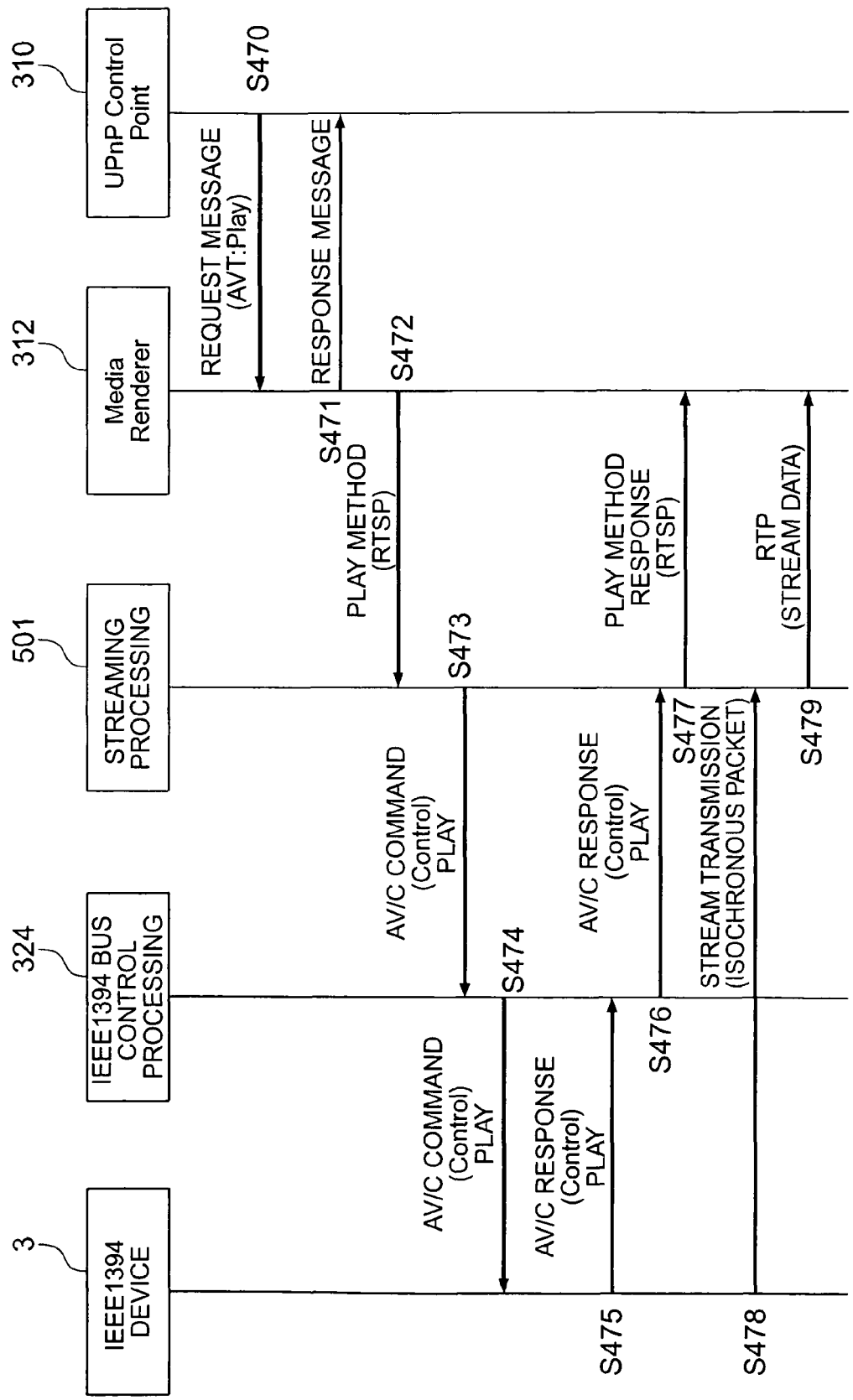
FIG. 17 is a diagram illustrating a software operation sequence during stream reproduction of a gateway device according to Embodiment 2 of the present invention.

Next, a software operation in the reproduction S315 is described. FIG. 17 is a diagram illustrating a sequence of software operations in the reproduction S315.

In Step S470, the UPnP control point 310 transmits a message containing a "Play" action request to the media renderer 312 by using a SOAP.

In Step S471, the media renderer 312 returns a response message to notify the UPnP control point 310 of reception of the "Play" action request.

In Step S472, the media renderer 312 subsequently transmits a content transfer start request to the UPnP-IEEE1394 gateway 2 by using a PLAY method of the RTSP. Accordingly, the streaming processing 501 of the UPnP-IEEE1394 gateway 2 receives the PLAY method of the RTSP.

In Step S473, upon reception of the message, the streaming processing 501 transmits "PLAY" of an AV/C command as a playback mode "FORWARD" to the IEEE1394 bus control processing 324.

In Step S474, the IEEE1394 bus control processing 324 transmits the AV/C command "PLAY" as the playback mode "FORWARD" to the IEEE1394 device 3 via the IEEE1394 stack 322.

In Step S475, the IEEE1394 device 3 that has received the AV/C command "PLAY" executes reproduction start processing, and then returns an AV/C response containing information of the content reproduction start to the IEEE1394 bus control processing 324 via the IEEE1394 stack 322.

In Step S476, the IEEE1394 bus control processing 324 transmits the received AV/C response to the streaming processing 501 which is a transmission source of the AV/C command.

In Step S477, the streaming processing 501 returns a response of the PLAY method of the RTSP to the media renderer 312.

In Step S478, the IEEE1394 device 3 contains content stream data in an isochronous packet of the IEEE1394 to transmit it in a format of MPEG2-TS or the like. The streaming processing 501 receives this isochronous packet.

In Step S479, the streaming processing 501 takes out the data in the stream format of the MPEG2-TS or the like from this packet, and changes the packet of the data to an RTP packet to transmit it to the media renderer 312.

The media renderer 312 takes out the stream data from the received RTP packet, and executes demultiplexing and decoding to start reproduction of contents.

In the case of interrupting the stream reproduction, a message containing a "STOP" action request is transmitted from the UPnP control point 310 to the media renderer 312. The media renderer 312 transmits a TEARDOWN method of the RTSP to the streaming processing 501 of the UPnP-IEEE1394 gateway 2. Then, the streaming processing 501 transmits an AV/C command "WIND" as a subfunction "STOP" to the IEEE1394 device 3 via the IEEE1394 bus control processing 324, thereby stopping the reproduction of the IEEE1394 device 3.

Embodiment 3

Figure 18:
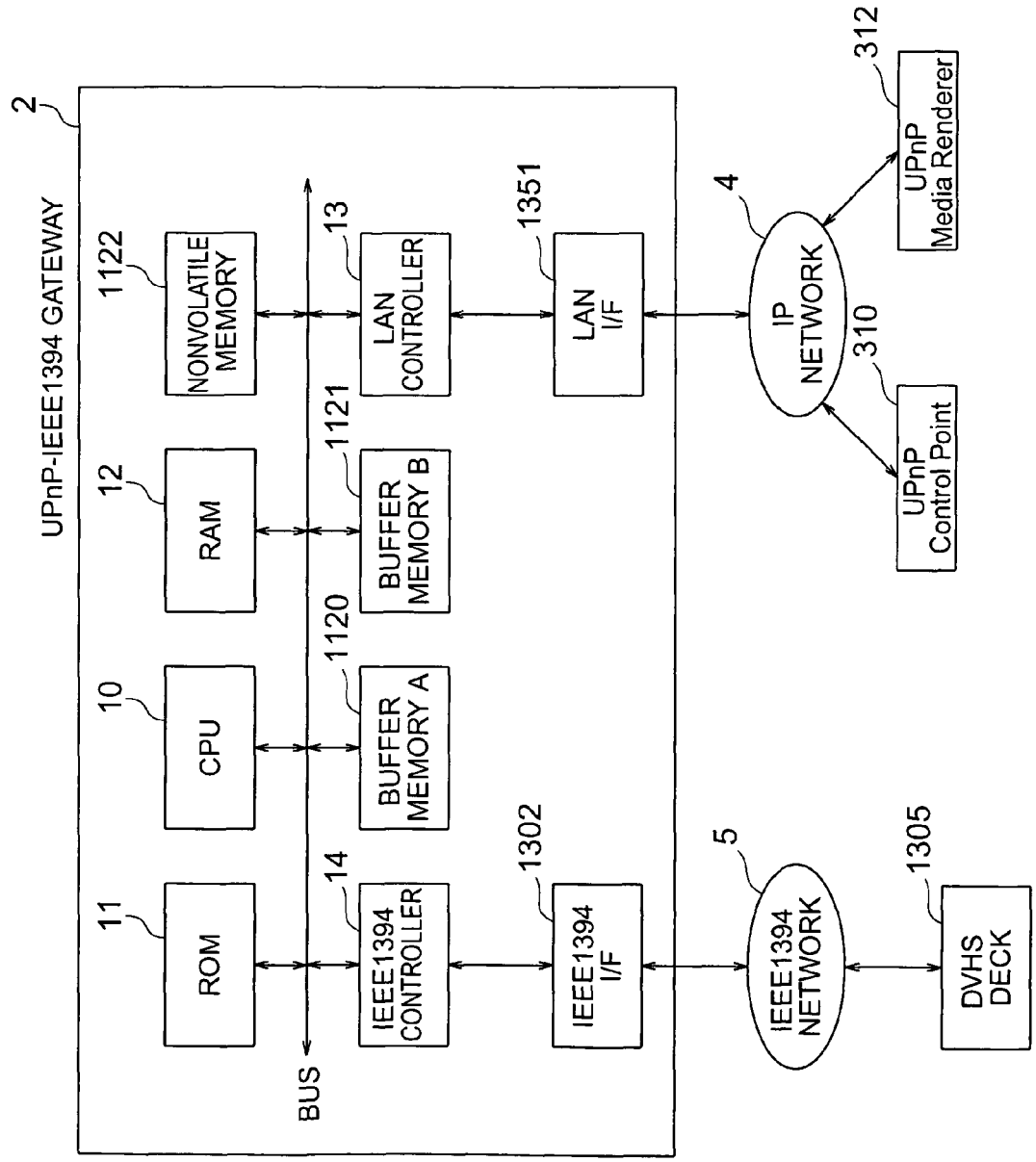
FIG. 18 is a configuration diagram illustrating a modified example of a gateway device according to Embodiment 3 of the present invention.

FIG. 18 is a diagram illustrating a modified example of a gateway device according to Embodiment 3 of the present invention. A description will be made by taking an example of a system which reproduces a video of a digital video deck (DVHS) connected to an IEEE1394 network 5 by a UPnP media renderer 312 connected to an IP network 4.

In FIG. 18, a UPnP-IEEE1394 gateway 2 includes a central processing unit (hereinafter, referred to as CPU) 10, a ROM 11 which is a nonvolatile memory (read only memory: ROM)) for starting the system, and a RAM 12 which is a random access memory (RAM). The CPU 10 executes a program stored in the ROM 11 by using the RAM 12.

The UPnP-IEEE1394 gateway 2 also includes buffer memories 1120 and 1121. The buffer memories 1120 and 1121 are used when AV compressed data is transferred between the IEEE1394 network and an IP network 4. For convenience of description of operations, these are respectively referred to as buffer memories A1120 and B1121 hereinafter. These buffer memories may be disposed in the RAM 12. In order to separate functions, however, they are specified as the buffer memories A1120 and B1121.

The UPnP-IEEE1394 gateway 2 further includes a nonvolatile memory 1122. The nonvolatile memory 1122 is a nonvolatile memory such as a compact flash (registered trademark) memory having high deleting and writing speeds, and suitable for achieving a large capacity. A data area and a setting data area are prepared. The nonvolatile memory may be a battery backed-up memory.

The UPnP-IEEE1394 gateway 2 further includes an IEEE1394 controller 14. An IEEE1394 interface (I/F) 1302 for connection with the IEEE1394 network 5 is connected to the IEEE1394 controller 14. The IEEE1394 I/F 1302 includes, not shown in FIG. 1, a connector, a communication driver, and a receiver circuit, and is an interface between the IEEE1394 controller 14 and the IEEE1394 network 5. The IEEE1394 is an AV device network system used for a television set, a DVHS, and a digital video camera, and can transmit a device control signal and an MPEG-compressed AV compressed data. A DVHS deck 1305 transmits, based on an instruction of the UPnP-IEEE1394 gateway 2, contents (AV compressed data) recorded in a DVHS tape to the UPnP-IEEE1394 gateway 2 via the IEEE1394 network 5. The IEEE1394 controller 14 transmits, based on control of the CPU 10, a control signal to the DVHS deck 1305 connected to the IEEE1394 I/F 1302, and receives contents.

The UPnP-IEEE1394 gateway 2 includes a LAN controller 13. A LAN interface (I/F) 1351 for connection with the IP network 4 is connected to the LAN controller 13.

Next, an operation when contents recorded in the DVHS deck 1305 are reproduced by the UPnP media renderer 312 is described. A user instructs reproduction of contents in the DVHS deck 1305 by using a UPnP control point 310. The CPU 10 interprets a Play action of an AV transport 315 service from the UPnP control point 310, and transmits an AV/C command "PLAY" to the DVHS deck 1305 via the IEEE1394 controller 14 and the IEEE1394 I/F 1302 through the IEEE1394 network 5, thereby instructing outputting of contents recorded in the DVHS tape set in the DVHS deck 1305. The DVHS deck 1305 performs an operation of transmitting the contents recorded in the DVHS tape to the UPnP-IEEE1394 gateway 2. The contents are transferred from the DVHS deck 1305 to the buffer memory A1120 via the IEEE1394 network 5, the IEEE1394 I/F 1302, and the IEEE1394 controller 14.

The contents transferred to the buffer memory A1120 (AV compressed data of MPEG2-TS format) are sequentially transferred by packet units to the LAN controller 13, and transmitted as RTP packets to the UPnP media renderer 312 via the LAN I/F 1351 and the IP network 4, and the contents selected by the user are displayed/reproduced.

Figure 19:
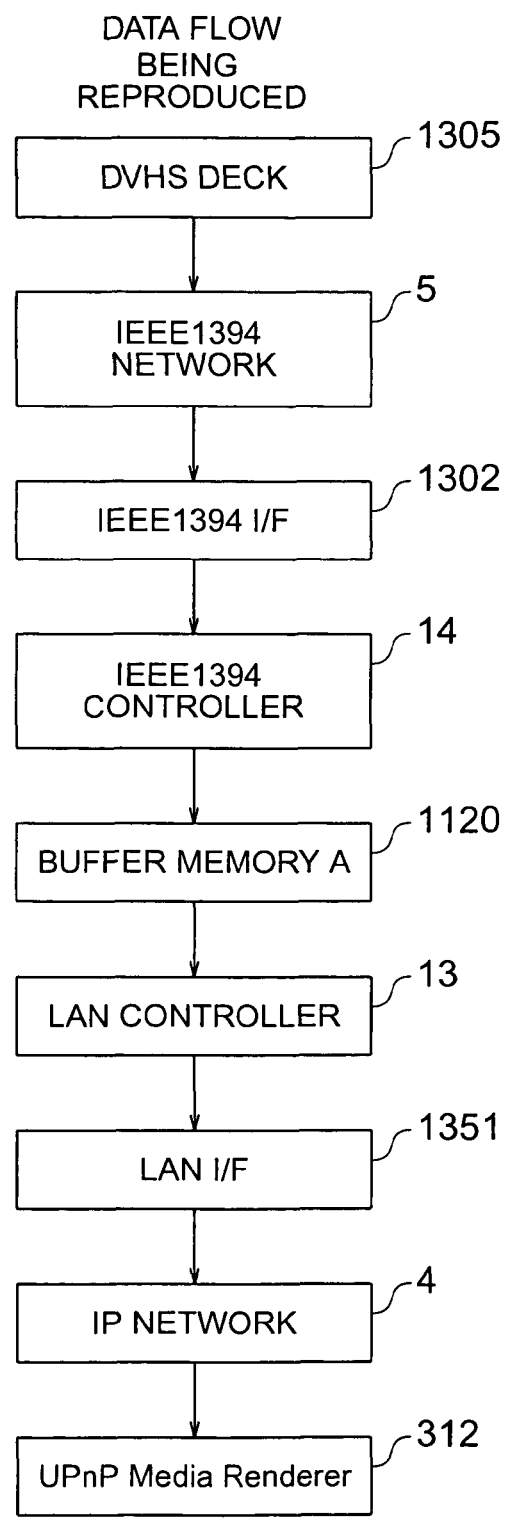
FIG. 19 is an explanatory diagram illustrating a flow of data being reproduced in the gateway device according to Embodiment 3 of the present invention.

FIG. 19 illustrates a flow of data being reproduced. The contents recorded in the DVHS deck 1305 are transferred from the DVHS deck 1305 to the IEEE1394 network 5, the IEEE1394 I/F 1302, the IEEE1394 controller 14, the buffer memory A1120, the LAN controller 13, the LAN I/F 1351, and the IP network 4 to be reproduced by the UPnP media renderer 312.

Figure 20:
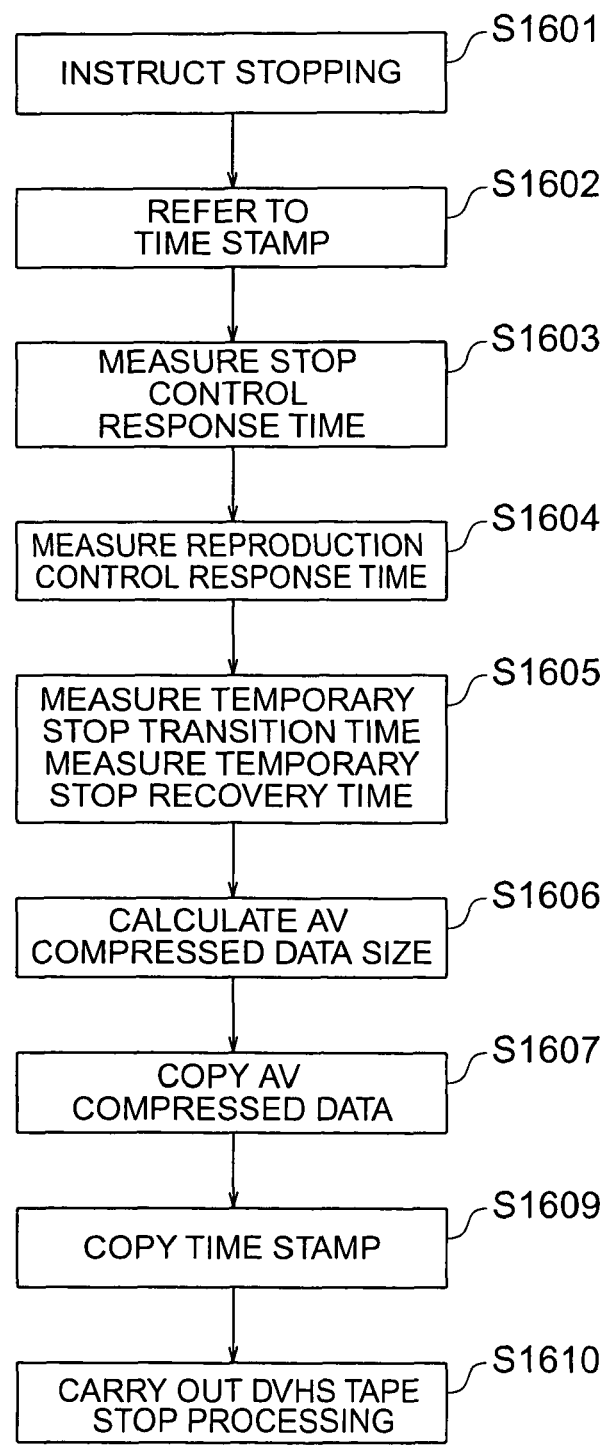
FIG. 20 is a flowchart illustrating a stop processing operation in the gateway device according to Embodiment 3 of the present invention.

It is presumed that the user has transmitted a content stop instruction by using the UPnP control point 310. An operation flow of this case is described below by referring to a flowchart of FIG. 20.

First, when, in Step S1601, the CPU 10 interprets a Stop action of the AV transport 315 service transmitted from the UPnP control point 310, in Step S1602, reference is made to a first time stamp of AV compressed data in the buffer memory A1120.

In Step S1603, an AV/C command "WIND" is transmitted as a subfunction "STOP" from the UPnP-IEEE1394 gateway 2 to the DVHS deck 1305, thereby instructing stopping of content reproduction. A period of time until the DVHS deck 1305 completes stop processing, in other words, stop control response time, is measured.

In Step S1604, an AV/C command "PLAY" is transmitted as a playback mode "FORWARD" from the UPnP-IEEE1394 gateway 2 to the DVHS deck 1305, thereby instructing content reproduction. A period of time until the contents are transferred to the buffer memory A1120 of the UPnP-IEEE1394 gateway 2, in other words, reproduction control response time, is measured.

In Step S1605, an AV/C command "PLAY" is transmitted as a playback mode "FORWARD PAUSE" from the UPnP- IEEE1394 gateway 2 to the DVHS deck 1305, thereby instructing temporary stopping of content reproduction. A period of time until the DVHS deck 1305 completes temporary stop processing, in other words, temporary stop transition control response time, is measured. An AV/C command "PLAY" is transmitted as a playback mode "FORWARD" to the DVHS deck 1305, thereby instructing reproduction from a content temporary stop status. A period of time from a start of reproduction processing from the temporary stop status by the DVHS deck 1305 to transferring of the contents to the buffer memory A1120 of the UPnP-IEEE1394 gateway 2, in other words, temporary stop recovery response time, is measured.

Subsequently, in Step S1606, based on the reproduction control response time, the stop control response time, the temporary stop transition control response time, the temporary stop recovery response time, and the time stamp information in Step S1602, a size of AV compressed data equal to or more than the reproduction control response time is calculated from a time stamp one second before the time stamp and thereafter. For example, when the time stamp information is 0:05:00:00, and a total of the reproduction control response time, the stop control response time, the temporary stop transition control response time, and the temporary stop recovery response time is 10 seconds, for example, with a greater margin, a size of AV compressed data three times larger, that is, 30 seconds, is calculated.

This size of the AV compressed data is compared with a capacity of the nonvolatile memory 1122. If the size is within the capacity, in Step S1607, AV compressed data of 30 seconds immediately after the stop is transferred from the DVHS deck 1305 to the nonvolatile memory 1122. If the size of the AV compressed data exceeds the capacity of the nonvolatile memory 1122, the margin is deleted, and a capacity is determined to be transferred.

In Step S1609, a last time stamp (last time stamp information) of the AV data copied to the nonvolatile memory 1122 is copied to the setting data area of the nonvolatile memory 1122. In other words, in the aforementioned example, because the time stamp information is 0:05:00:00, and the time stamp is one second before, equal to 30 seconds, last time stamp information of 0:05:29:00 is copied.

Subsequently, in Step S1610, an AV/C command "RELATIVE TIME COUNTER" is transmitted to the DVHS deck 1305, and the DVHS tape is rewound to time obtained by adding the reproduction control response time to the time stamp information to stop. In other words, for example, when the time stamp information is 0:05:00:00, and the reproduction control response time is 10 seconds, the DVHS tape is rewound to 0:05:10:00 to stop.

Next, it is presumed that the user has transmitted a stopped content reproduction instruction as a Stop action of the AV transport 315 service to the UPnP-IEEE1394 gateway 2 by using the UPnP control point 310. An operation flow of this case is described below by referring to FIG. 21. Upon interpretation of the reproduction instruction in Step S1701, the UPnP-IEEE1394 gateway 2 transmits an AV/C command "PLAY" as a playback mode "FORWARD" to the DVHS deck 1305 in Step S1702. The reproduction processing of the DVHS deck 1305 is carried out in Step S1750. However, this processing needs only the reproduction control response time measured in the stop processing, whereby processing in Step S1703 and thereafter is executed in the meantime. In other words, in Step S1703, the last time stamp information recorded in the setting data area of the nonvolatile memory 1122 is obtained.

In Step S1704, the recorded AV compressed data is transferred from the data area of the nonvolatile memory 1122 to the buffer memory B1121, and further transferred from the buffer memory B1121 to the UPnP media renderer 312 via the LAN controller 13, the LAN I/F 1351, and the IP network 4 to execute reproduction. Then, with conditional branching of Step S1705, until completion of synchronous processing executed in Step S1752 described below, the process returns to Step S1704 to reproduce the AV compressed data recorded in the data area of the nonvolatile memory 1122. In this period, contents are transferred from the DVHS deck 1305 to the buffer memory A in Step S1751, and synchronous processing (Step S1752) is carried out in Step S1752. Upon judgment of the completion of the synchronous processing Step S1752 in Step S1705, switching processing Step S1710 is carried out, and normal reproduction is carried out in Step S1711.

Figure 22:
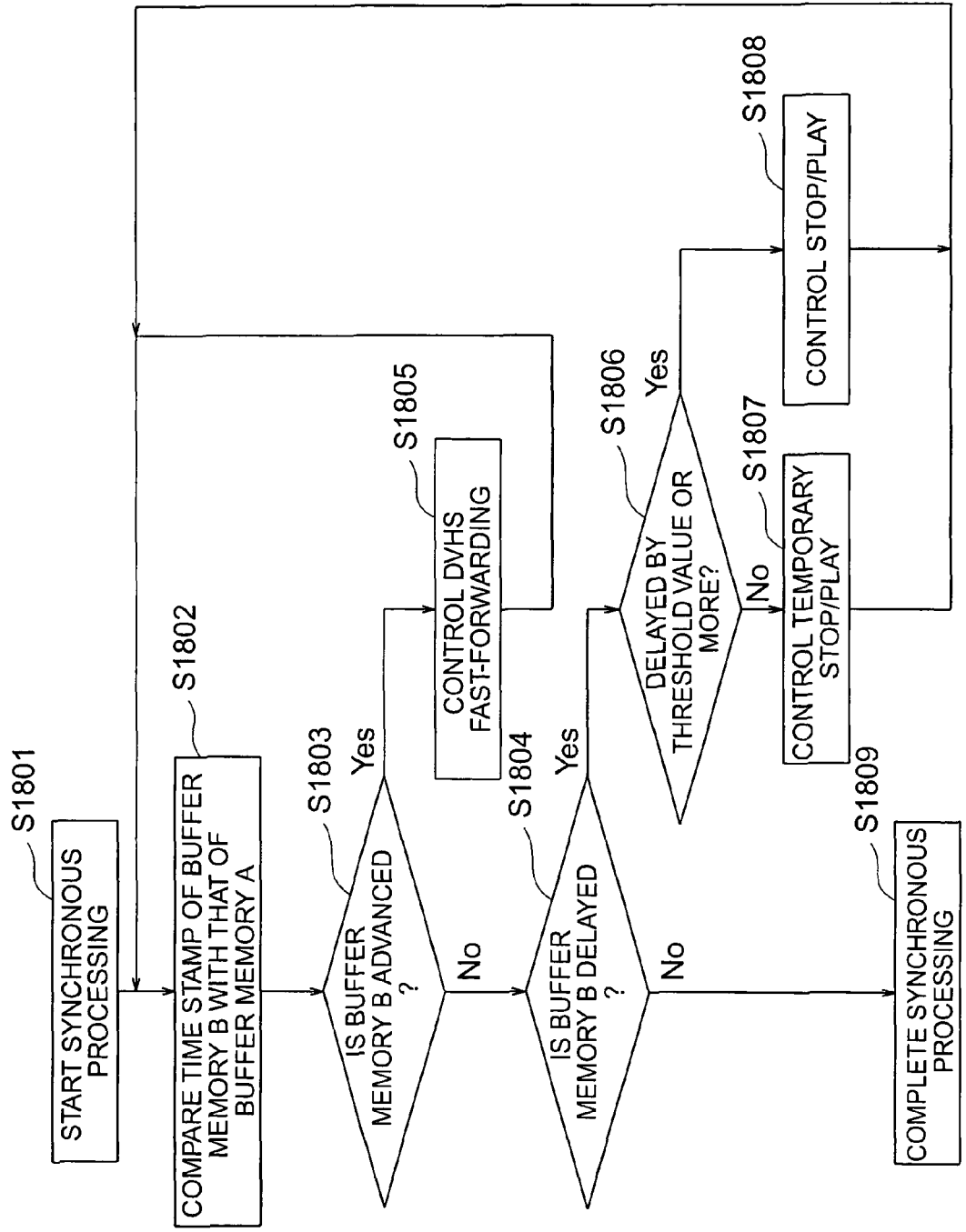
FIG. 22 is a flowchart illustrating a synchronization processing operation in the gateway device according to Embodiment 3 of the present invention.

Processing of the synchronous processing Step S1752 is described below by referring to FIG. 22.

In Step S1801, the synchronous processing is started. In Step S1802, a time stamp of the buffer memory B1121 is compared with a time stamp of a latest data packet input to the buffer memory A1120. The AV compressed data is transferred from the nonvolatile memory 1122 to the buffer memory B1121, while the AV compressed data is transferred from the DVHS deck 1305 to the buffer memory A1120. If it is judged in Step S1803 that the time stamp of the buffer memory B1121 is ahead of that of the buffer memory A1120, the data from the DVHS deck 1305 is delayed, and thus the process forwards the data by an amount equal to delayed seconds in Step S1805 to return to Step S1802. The judgment as to whether the data is ahead is made based on judgment whether the data is ahead by an amount equal to or more than a threshold value calculated from seconds of data to be stored in the buffer memories A1120 and B1121. In other words, for example, presuming that data of 5 seconds are stored in the buffer memories A1120 and B1121, if the data is ahead by 40% or more, i.e., 2 seconds or more, the data of the buffer memory B1121 is judged to be ahead.

This situation is described below by referring to FIG. 23.

Figure 23:
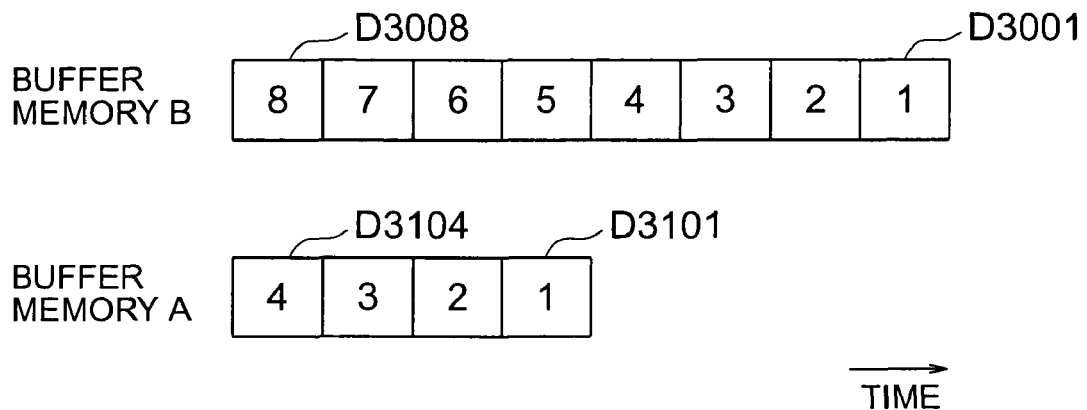
FIG. 23 is an explanatory diagram illustrating arraying of data of buffer memories B1121 and A1120 in the gateway device according to Embodiment 3 of the present invention.

FIG. 23 illustrates rows of data packets input to the buffer memories A1120 and B1121. In the buffer memory B1121, pieces of data are input in order from "1" of D3001, and "8" of D3008 indicates latest data input to the buffer memory. In the buffer memory A1120, pieces of data are input in order from "1" of D3101, and "4" of D3104 indicates latest data input to the buffer memory. When the pieces of latest data are compared with each other, which is a comparison between D3008 and D3104, the data of the buffer memory B1121 is ahead.

If it is judged in Step S1803 that the data is not ahead by 40% or more of that of the buffer memory, whether the data of the buffer memory B1121 is delayed from that of the buffer memory A1120 is judged in Step S1804. If the delay is judged, in Step S1806, whether the delay is equal to or more than a threshold value is judged. This threshold value is determined based on a sum of the stop control response time and the reproduction control response time measured by the processing during the stop. In other words, if the AV compressed data from the DVHS deck 1305 is ahead by an amount equal to or more than the sum of the stop control response time and the reproduction control response time, in Step S1808, the process of stopping and reproduction of the DVHS deck 1305 is carried out to return to Step S1802.

If it is judged in Step S1806 that the delay is equal to or less than the threshold value, in Step S1807, temporary stop processing is executed. The process of the temporary stop is carried out based on the temporary stop transition time and the temporary stop recovery time measured by the processing during the stop to return to Step S1802.

If it is judged in Step S1804 that the data is not delayed, in other words, an advance rate of the data of the buffer memory B1121 is within a range of a threshold value (40% or less in the aforementioned example) calculated from seconds of data to be stored in the buffer memories A1120 and B1121, the synchronous processing is completed in Step S1809.

In other words, at the completion time of the synchronous processing, the data of the buffer memory B1121 is ahead of that of the buffer memory A1120 by an amount within a difference of 40% or less of a total buffer memory capacity.

Figure 21:
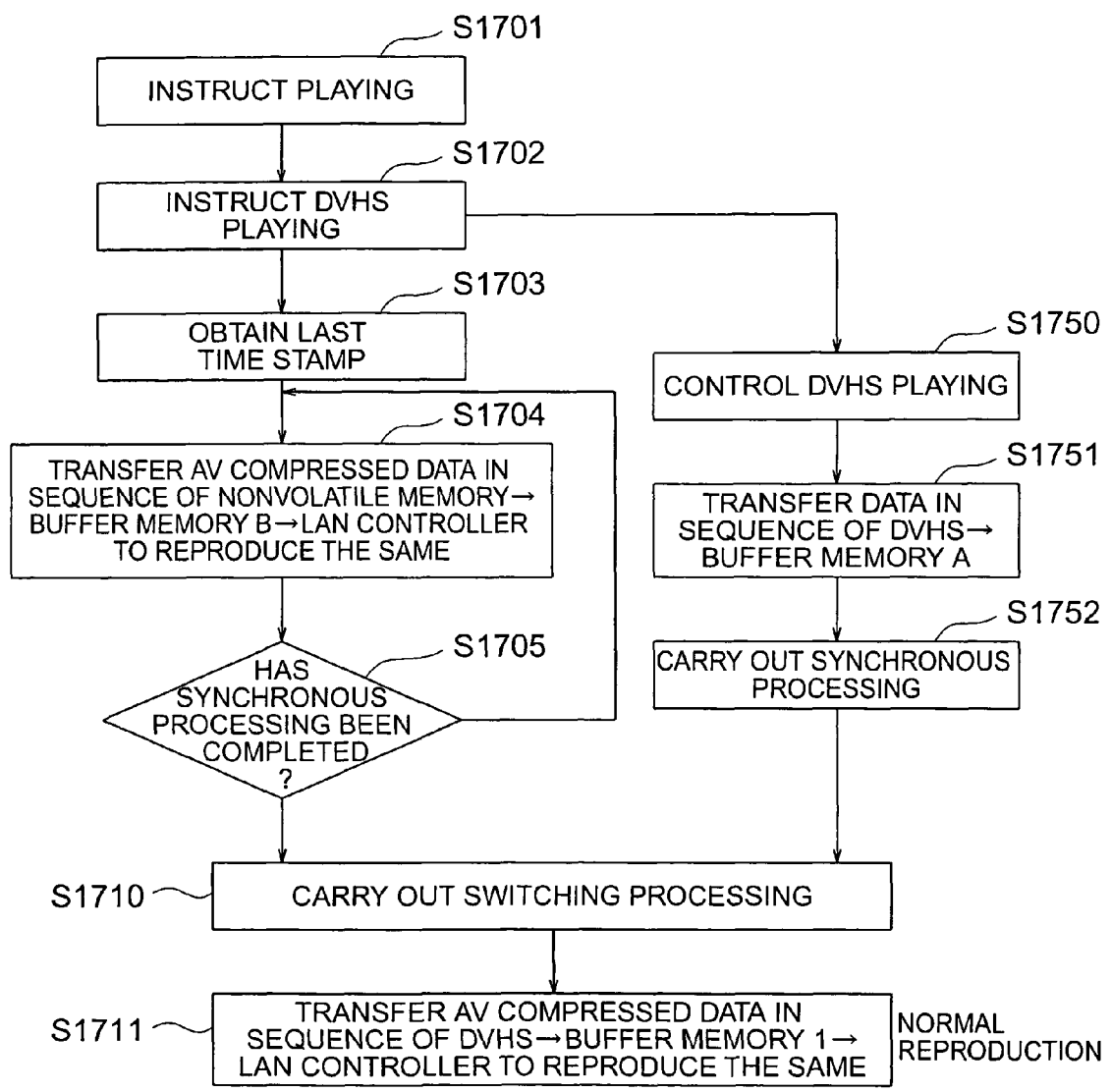
FIG. 21 is a flowchart illustrating a reproduction processing operation in the gateway device according to Embodiment 3 of the present invention.
Figure 24:
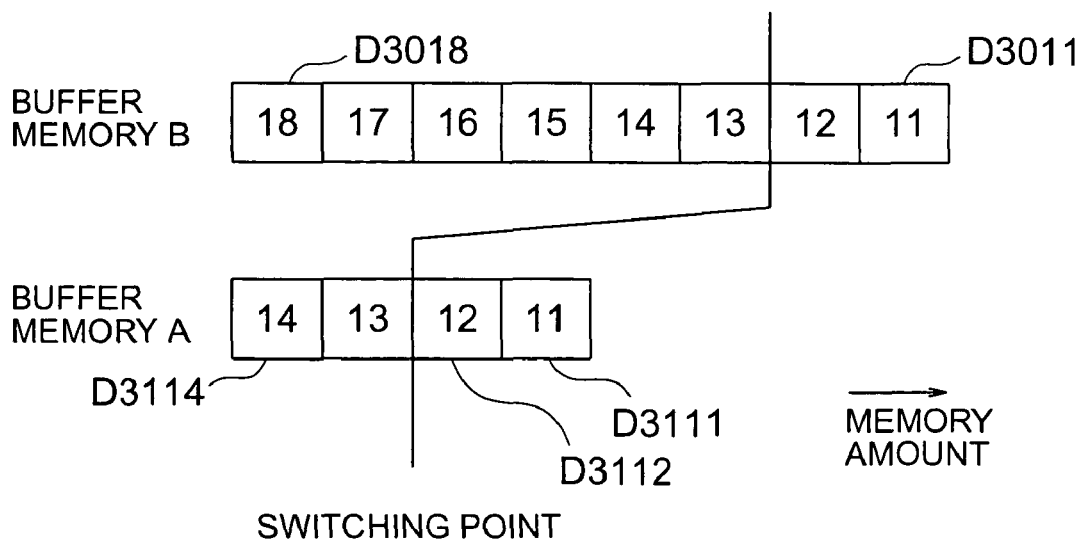
FIG. 24 is an explanatory diagram illustrating a switching point in the gateway device according to Embodiment 3 of the present invention.

The switching processing in Step S1710 of the flowchart of FIG. 21 is described by referring to FIG. 24. FIG. 24 illustrates rows of data packets input to the buffer memories A1120 and B1121 at the completion time of the synchronous processing. Data of the buffer memory B1121 is ahead of that of the buffer memory A1120 within a range of 40% of the buffer memory.

A reproduced image of the DVHS tape immediately after a start of reproduction from a stop or temporary stop status may be disturbed because of an unstable operation of the DVHS deck 1305. To prevent this, an image of the buffer memory A1120 from the DVHS deck 1305 is directly discarded without using data of several seconds, for example, 2 seconds, immediately after the start of reproduction. In the example of FIG. 24, "11" of D3111 and "12" of D3112 of the buffer memory A1120 are discarded. Then, by using a breakpoint of the data packet (e.g., breakpoint of time stamp) as a switching point, the data is switched from the buffer memory B1121 to the buffer memory A1120. In this case, because the data of the buffer memory B1121 is ahead while the data of the buffer memory A1120 is behind, the amount of AV compressed data stored in the buffer memory A1120 is smaller than that in the buffer memory B1121. In other words, a buffer memory used for reproducing data from the DVHS deck 1305 after switching can be reduced. If the buffer memory A1120 is dynamically secured, the memory is opened to be used for other programs.

As described above, according to Embodiment 3, the UPnP-IEEE1394 gateway 2 includes the CPU 10, the RAM 12, the ROM 11 which is a novolatile memory for storing programs, the IEEE1394 I/F 1302 and the IEEE1394 controller 14 which are network devices for obtaining video data from the DVHS deck 1305 serving as the sequentially accessible video distribution device connected to the IEEE1394 network 5, the nonvolatile memory 1122 for storing a part of the video data, the buffer memories A1120 and B1121 for temporarily storing the video data, and the LAN controller 13 and the LAN I/F for transmitting the video data. The UPnP-IEEE1394 gateway 2 includes means for copying, when reproduction of the video data is stopped, the video data after the stop from the DVHS deck 1305 to the nonvolatile memory 1122 via the IEEE1394 network 5, means for storing the last data information (time stamp) of the video data of the nonvolatile memory 1122, means for transferring, when the stop status is changed to a reproduction status, the video data of the nonvolatile memory 1122 to the buffer memory B1121, means for transferring the video data from the buffer memory B1121 to the LAN controller 13, means for simultaneously transferring the video data of the last data information and thereafter from the DVHS deck 1305 to the buffer memory A1120 via the IEEE1394 network 5, and means for changing, based on the last data information, the video data to be transferred to the UPnP media renderer 312 from the buffer memory B1121 to the buffer memory A1120. Thus, standby time after power is turned on is greatly shortened, and usability is improved. In addition, since the video data stored in the nonvolatile memory 1122 is reproduced immediately after reproduction control, the reproduced video can be displayed within a short period of time.

The time stamp data contained in the video data is used as the last data information. Thus, initializing processing of the DVHS deck 1305 is concurrently carried out, and the video data is switched based on the time stamp information after completion of the initializing processing. Accordingly, the switching is smoothly carried out.

During the reproduction stop of the video data, the video data to be copied from the DVHS deck 1305 to the nonvolatile memory 1122 contains the video data before a stop position. The reproduction is started from the video data before the stop position, and data being processed by the decoder is also reproduced during the stop control. Thus, by user's stopping/reproducing operation, control can be carried out so that no video remains to be reproduced.

The video data containing the last data information is not transferred from the nonvolatile memory 1122 to the buffer memory B1121. Thus, the video data containing the last data information in the last area of the nonvolatile memory 1122 is not used for reproduction, whereby video disturbance caused by a data shortage can be prevented.

The nonvolatile memory 1122 is a memory available for battery back-up. Thus, by using a battery backed-up memory as a nonvolatile video memory, this memory can be substituted for the memory incorporated in the UPnP-IEEE1394 gateway 2, thereby integrating memories in the device.

The UPnP-IEEE1394 gateway 2 includes means for controlling the DVHS deck 1305 connected to the IEEE1394 network 5 to transmit video data, and calculating reproduction control response time until desired video data is transferred to the buffer memory A1120. Based on the reproduction control response time, a size of video data transferred to the nonvolatile memory 1122 is designated. Thus, a size of video data to be stored in the nonvolatile memory 1122 is determined according to a response speed of the DVHS deck 1305 connected to the network, whereby the nonvolatile memory 1122 can effectively be used.

The UPnP-IEEE1394 gateway 2 includes means for controlling video data transmission from the DVHS deck 1305 so that time stamps of the video data temporarily stored in the buffer memories B1121 and A1120, respectively, can be similar and contained at the same time. When the time stamps of the video data temporarily stored in the buffer memories B1121 and A1120, respectively, are similar and contained at the same time, the video data to be transmitted to the UPnP media renderer 312 is switched from the buffer memory B1121 to the buffer memory A1120. Thus, for the DVHS deck 1305 which allows only sequential access, the DVHS deck 1305 is controlled so that data of similar time stamps can be contained in the buffers, and the buffer memory is switched. Accordingly, for a sequentially accessed video, a reproduced image that causes no uncomfortable feeling can be obtained even in the case of a new device.

When the time stamps of the video data temporarily stored in the buffer memories B1121 and A1120, respectively, are similar, and contained at the same time, video data transmission from the DVHS deck 1305 is controlled so that the used amount of the buffer memory B1121 can be reduced. Thus, since the amount of data from the DVHS deck 1305 temporarily stored in the buffer memory is smaller than that of data from the nonvolatile memory 1122 during switching, the buffer memory from the video distribution device after the switching can be set low.

After control is carried out so that the time stamps of the video data temporarily stored in the buffer memories B1121 and A1120, respectively, can be similar and contained in the same time, the video data from the buffer memory A1120 is discarded for a certain period of time, and then, the video data to be transmitted to the UPnP media renderer 312 is switched from that of the buffer memory B1121 to that of the buffer memory A1120. Thus, by discarding the data from the DVHS deck 1305 for a certain period of time, video disturbance seen immediately after the reproduction start in the sequentially accessible video distribution device can be removed.

Since control of the video data transmission from the DVHS deck 1305 is carried out by using controls of reproduction, stop, temporary stop and fast-forward for the video distribution device, the synchronous processing can be carried out by general control of the DVHS deck 1305. Thus, the present invention can be applied to conventional video distribution devices.

The UPnP-IEEE1394 gateway 2 includes means for controlling the DVHS deck 1305 in the reproduction status connected to the IEEE1394 network 5 to stop transmission of the video data and calculating stop control response time until transmission of the video data to the buffer memory A1120 is stopped, means for controlling the DVHS deck 1305 connected to the IEEE1394 network 5 to transmit the video data and calculating reproduction control response time until desired video data is transferred to the buffer memory A1120, means for controlling the DVHS deck 1305 in the reproduction status connected to the IEEE1394 network 5 to temporarily stop transmission of the video data and calculating temporary stop control response time until transfer of the video data to the buffer memory A1120 is stopped, and means for controlling the DVHS deck 1305 in the temporarily stopped status connected to the IEEE1394 network 5 to transmit the video data and calculating temporary stop recovery response time until video data is transferred to the buffer memory A1120. Based on the reproduction control response time, the stop control response time, the temporary stop control response time, and the temporary stop recovery response time, controls of reproduction, stop, temporary stop and fast-forward of the DVHS deck 1305 are carried out. Thus, control is carried out so that the time stamps of the video data temporarily stored in the buffer memories B1121 and A1120, respectively, can be similar and contained at the same time, whereby the synchronous processing can be executed by general control of the DVHS deck 1305. Thus, the present invention can be applied to the conventional video distribution devices.

Embodiment 4

Figure 25:
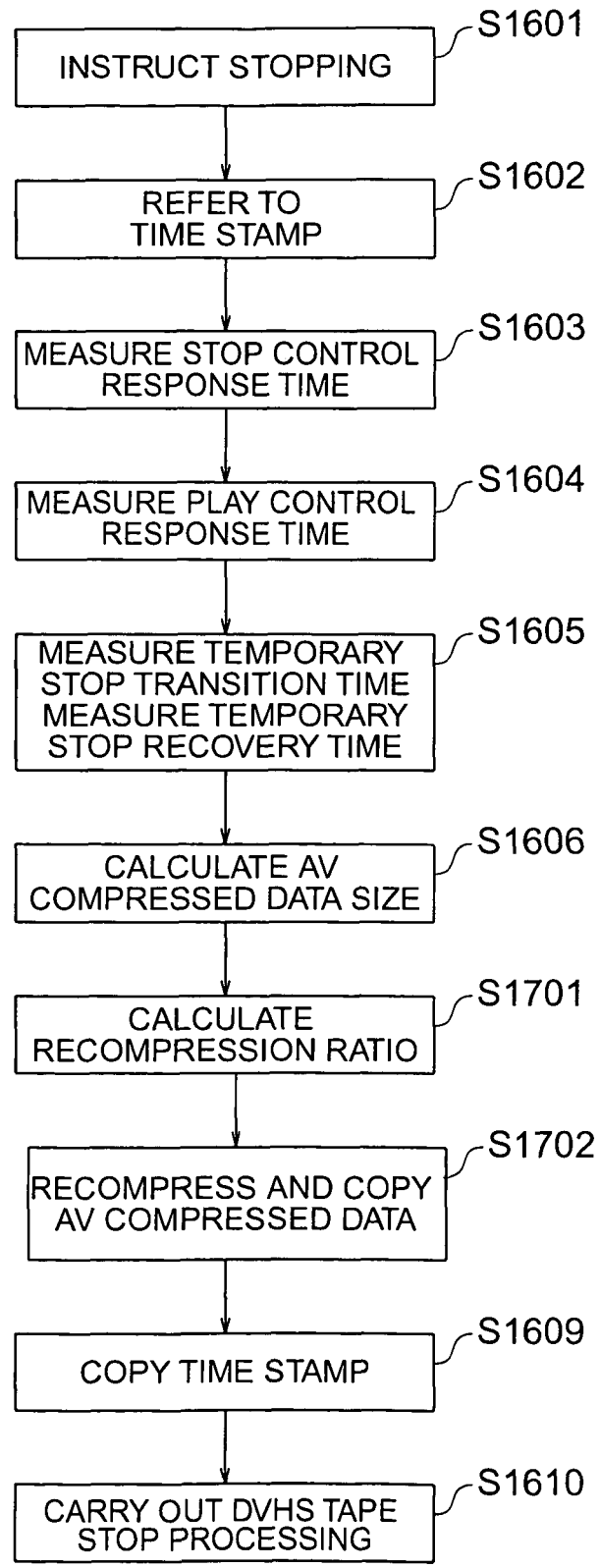
FIG. 25 is a flowchart illustrating a stop processing operation in a gateway device according to Embodiment 4 of the present invention.
Figure 26:
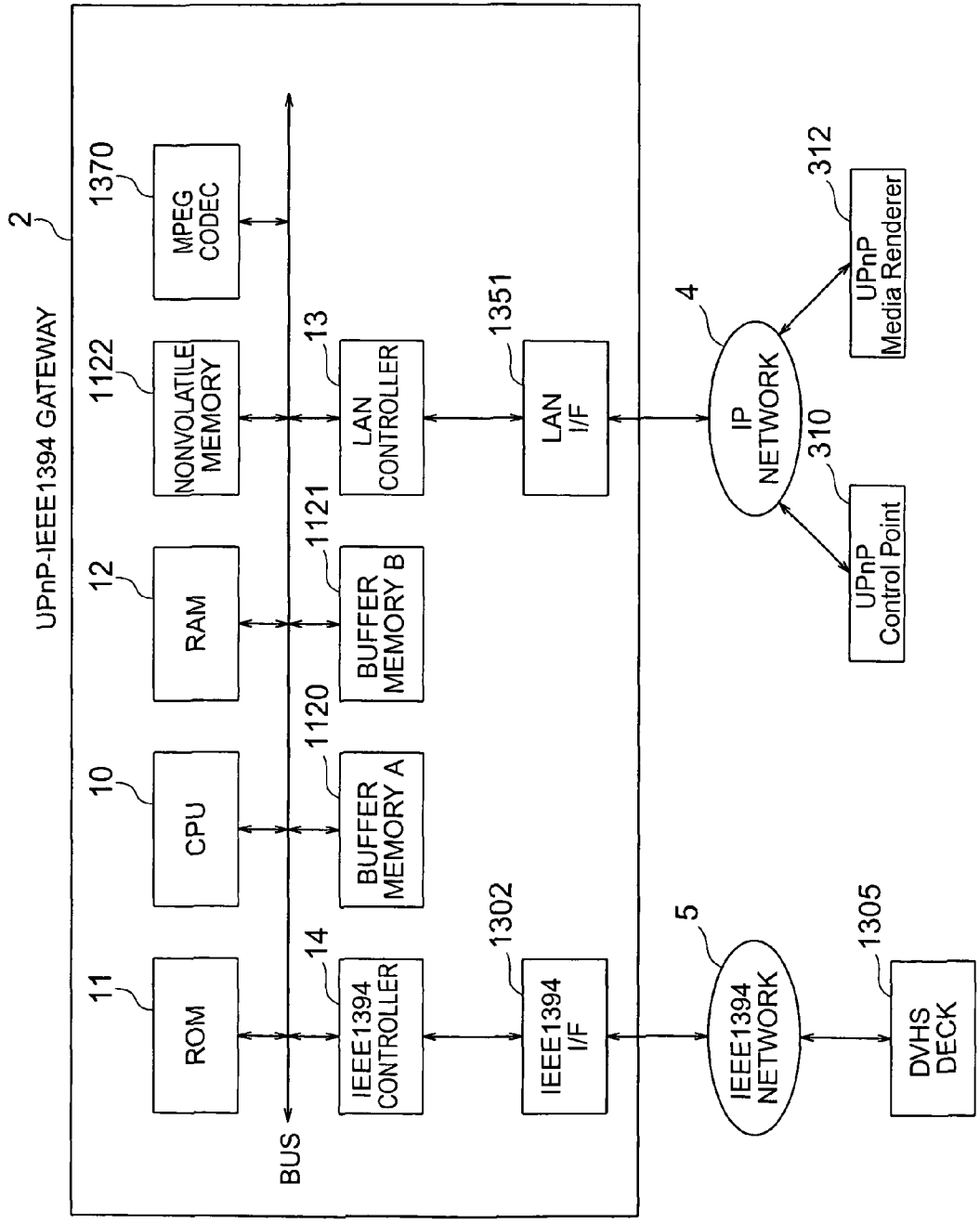
FIG. 26 is a diagram illustrating a configuration of the gateway device according to Embodiment 4 of the present invention.

According to Embodiment 4, processing of a stop instruction is carried out as shown in FIG. 25. In other words, a flow of an operation when a user transmits a content stop instruction by using a UPnP control point 310 is described by referring to a flowchart of FIG. 25. For a configuration, as shown in FIG. 26, the UPnP-IEEE1394 gateway 2 of Embodiment 3 includes an MPEG CODEC 1370 for recompressing video data, and AV data for recording is compressed/decompressed by a Moving Picture Express Group (MPEG) which is one of video/audio compression/decompression systems. Other components are similar to those of FIG. 25.

When, in Step S1601 of FIG. 25, a CPU 10 interprets a Stop action of an AV transport 315 service transmitted from the UPnP control point 310, in Step S1602, a first time stamp of AV compressed data of a buffer memory A1120 is referred to. Subsequently, stop control response time is measured in Step S1603, then reproduction control response time is measured in Step S1604, and then temporary stop transition time and temporary stop recovery time are measured in Step S1605.

In Step S1606, based on the reproduction control response time, the stop control response time, the temporary stop transition control response time, the temporary stop recovery response time, and the time stamp information of Step S1602, from a time stamp one second before the time stamp, a size of an AV compressed data corresponding to the reproduction control response time or more is calculated. For example, when time stamp information is 0:05:00:00, and a total of the reproduction control response time, the stop control response time, the temporary stop transition control response time, and the temporary stop recovery response time is 10 seconds, for example, with a greater margin, a size of AV compressed data three times larger, that is, 30 seconds, is calculated.

In Step S1701, a recompression ratio of AV compressed data is calculated from a capacity of a nonvolatile memory 1122. Based on this recompression ratio, in Step S1702, AV compressed data of 30 seconds is recompressed by using the MPEG CODEC 1370. In this case, data near the last part of the AV compressed data of 30 seconds is recompressed so that a compression ratio can be equal to that of original AV compressed data.

This situation is described in easy terms. For example, a last of AV recompressed data of 30 seconds recorded in the nonvolatile memory 1122 when time stamp information is 0:05:00:00 is data near 0:05:29. A change in data compression ratio near this part is as shown in FIG. 27.

In FIG. 27, D2001, D2002, D2003, and D2004 constitute a group of AV recompressed data in the nonvolatile memory 1122. D2001 means a group of data of 0:05:26:00 to 0:05:26:59. Similarly, D2002, D2003, and D2004 respectively indicate data packets of frames of 0:05:27:00 to 0:05:27:59, 0:05:28:00 to 0:05:28:59, and 0:05:29:00.

It is presumed that there are three levels A to C of data compression ratios, and the compression ratio is low at the level A and becomes higher at the levels B and C in order. A compression ratio of AV compressed data before recompression, in other words, AV compressed data recorded in the DVHS tape is set to the level A. In this case, data near the last part of the AV compressed data of 30 seconds is recompressed so that a compression ratio can be equal to that of original AV compressed data. Accordingly, the high compression level C is set from 0:05:26:00 to 0:05:26:59 (D2001), the slightly lower compression level B is set from 0:05:27:00 to 0:05:27:59 (D2002), and the level A equal to the compression level of the AV compressed data before recompression is set from 0:05:28:00 to 0:05:28:59 (D2003).

In Step S1609 of FIG. 25, a last time stamp (last time stamp information) of the AV data copied in the nonvolatile memory 1122 is copied to a setting data area of the nonvolatile memory 1122. In other words, in the aforementioned example, last time stamp information of 0:05:29:00 is copied.

Subsequently, in Step S1610, for the DVHS deck 1305, a DVHS tape is rewound to time obtained by adding reproduction control response time to the time stamp information and is stopped. In other words, when time stamp information is 0:05:00:00, and reproduction control response time is 10 seconds, the DVHS tape is rewound to 0:05:10:00 and is stopped.

Next, it is presumed that a user has transmitted a stopped content reproduction instruction by using the UPnP control point 310. An operation in this case is similar to that of Embodiment 3, and thus description thereof is omitted.

Accordingly, image quality slightly deteriorates because of effective memory use in the case of reproduction from the nonvolatile memory 1122. On the other hand, a compression ratio is gradually changed in the case of switching to the AV compressed data from the DVHS deck 1305. Thus, the data can be reproduced without causing any uncomfortable feeling about an image quality change.

As described above, according to Embodiment 4, the UPnP-IEEE1394 gateway 2 includes the MPEG CODEC 1370 for recompressing the video data. The video data from the DVHS deck 1305 is recompressed by the MPEG CODEC 1370 according to the memory capacity of the nonvolatile memory 1122 during the reproduction stop of the video data to be copied to the nonvolatile memory 1122. Thus, by recompressing data to be recorded in the nonvolatile memory 1122, a used amount of the RAM 12 can be reduced.

The last data of the video data whose compression ratio is changed during recompression of the video data and which is stored in the nonvolatile memory 1122 is recompressed so that the compression ratio can be equal to that before recompression. Thus, since the AV compressed data recorded in the nonvolatile video memory at the time of switching from the reproduction status of the nonvolatile memory 1122 to a normal reproduction status of the DVHS deck 1305 is similar to the normal reproduction status, an image quality change by switching less likely to be recognized.

The invention claimed is:

1. A gateway device comprising:
   a first communication unit connected to a first network which operates according to Internet Protocol (IP) used for the Internet to communicate with a device connected to the first network;
   a second communication unit connected to a second network to communicate with a device connected to the second network;
   an identifier management unit for outputting an IP identifier in the first network to correspond to the device connected to the second network;
   a correlation unit for starting an emulation process corresponding to the device connected to the second network, the emulation process correlating the IP identifier to the device connected to the second network;
   an identifier notification unit for notifying the IP identifier to the device connected to the first network;
   a command information notification unit for notifying command information which can be executed in the first network to the device connected to the first network;
   a command conversion unit for converting a command of the first network, which is received from the device connected to the first network, into a command of the second network; and
   a stream transfer unit for converting stream data transmitted from the second network based on a transfer protocol of the second network into a transfer protocol of the first network to transfer the stream data to the first network, wherein the gateway device supplies the converted command to the emulation process corresponding to the device connected to the second network on the basis of the IP identifier, in order to operate_the device connected to the second network to transfer the stream data stored in the device to the device connected to the first network in accordance with the command.

2. The gateway device according to claim 1, wherein:
   the first network comprises a UPnP network; and
   the second network comprises an IEEE1394 network.

3. The gateway device according to claim 1, wherein an HTTP is used as the transfer protocol of the first network.

4. The gateway device according to claim 1, wherein an RTP is used as the transfer protocol of the first network.

5. A gateway device comprising:
   a CPU;
   a memory;
   a nonvolatile memory for storing an operation program of the CPU;
   a network device for obtaining video data from a sequentially accessible video distribution device connected to a second network;
   a nonvolatile video memory for storing a part of the video data; and
   a first buffer memory and a second buffer memory for temporarily storing the video data,
   the gateway device further comprising:
   a copying unit for copying, upon reception of a stop instruction signal for stopping reproduction of the video data, the video data from the video distribution device following reception of the stop instruction by a preset first predetermined amount to the nonvolatile video memory via the second network;
   a last data storage unit for storing last data information to identify last video data of the video data of the nonvolatile video memory copied thereto by the first predetermined amount;
   a first transfer unit for transferring, upon reception of a reproduction instruction signal to reproduce the video data whose reproduction has been stopped according to the stop instruction signal, the video data of the nonvolatile video memory to the first buffer memory;
   a second transfer unit for transferring the video data transferred to the first buffer memory from the first buffer memory to a first network;
   a third transfer unit for transferring, simultaneously with the transfer to the first network by the second transfer unit, the video data from the video distribution device following the last video data to the second buffer memory via the second network based on the last data information;
   a detection unit for detecting that the second transfer unit has transferred the video data up to the last video data stored in the first buffer memory to the first network based on the last data information; and
   a fourth transfer unit for stopping, upon detection by the detection unit, the transfer to the first network by the second transfer unit to transfer the video data stored in the second buffer memory from the second buffer memory to the first network.

6. The gateway device according to claim 5, wherein the last data information comprises time stamp data contained in the video data.

7. The gateway device according to claim 5, wherein the video data copied to the nonvolatile video memory by the copying unit during a reproduction stop of the video distribution device contains a preset second predetermined amount of the video data from the video data distribution device before a stop position.

8. The gateway device according to claim 5, wherein the first transfer unit avoids transferring the video data containing the last data information from the nonvolatile video memory to the first buffer memory.

9. The gateway device according to claim 5, wherein the nonvolatile video memory includes a memory available for battery backup.

10. The gateway device according to claim 5, further comprising a reproduction control response time calculation unit for controlling the video distribution device connected to the network to transmit the video data, and calculating a reproduction control response time from the point of time of controlling the video distribution device to transmit the data until the video data is transferred to the second buffer memory, wherein a video data size of the video data copied to the nonvolatile video memory by the copying unit is designated based on the reproduction control response time.

11. The gateway device according to claim 5, further comprising a decoder for decompressing the video data and an encoder for compressing the video data, wherein the video data copied from the video distribution device by the copying unit during the reproduction stop of the video data is recompressed by the decoder and the encoder to be copied to the nonvolatile video memory based on a memory capacity of the nonvolatile video memory and the reproduction control response time.

12. The gateway device according to claim 11, wherein, during recompression of the video data, a compression ratio is changed, and the recompression is carried out so that a compression ratio of the last data of the video data stored in the nonvolatile video memory is equal to a compression ratio before the recompression.

13. The gateway device according to claim 5, further comprising a transmission control unit for controlling transmission of the video data from the video distribution device so that time stamps of the video data temporarily stored in the first buffer memory and the second buffer memory, respectively, are similar and contained at the same time, wherein the fourth transfer unit switches, when, as a result of the control by the transmission control unit, the time stamps of the video data temporarily stored in the first buffer memory and the second buffer memory, respectively, are similar and contained at the same time, the video data to be transmitted to the first network from the first buffer memory to the second buffer memory.

14. The gateway device according to claim 13, wherein the transmission control unit controls, when the time stamps of the video data temporarily stored in the first buffer memory and the second buffer memory, respectively, are similar and contained at the same time, video data transmission from the video distribution device in a manner that reduces a used amount of the second buffer memory.

15. The gateway device according to claim 13, wherein after the transmission control unit performs control so that the time stamps of the video data temporarily stored in the first buffer memory and the second buffer memory, respectively, are similar and contained at the same time, the video data of the second buffer memory is discarded for a certain period of time, and then the fourth transfer unit switches the video data to be transmitted to the first network from the first buffer memory to the second buffer memory.

16. The gateway device according to claims 13, wherein the control of the video data transmission from the video distribution device by the transmission control unit includes controls of reproduction, stop, temporary stop, and fast-forward for the video distribution device.

17. The gateway device according to claim 13, further comprising:

a stop control response time calculation unit for calculating a stop control time starting from when the transmission control unit controls the video distribution device connected to the second network and set in a reproducing status to stop transmission of the video data until, the transfer of the video data to the second buffer memory is stopped;

a reproduction control response time calculation unit for calculating a reproduction control response time starting from when the transmission control unit controls the video distribution device connected to the second network to transmit the video data until the video data is transferred to the second buffer memory;

a temporary stop control response time calculation unit for calculating a temporary stop control response time starting from when the transmission control unit controls the video distribution device connected to the second network and set in the reproducing status to temporarily stop transmission of the video data until, the transfer of the video data to the second buffer memory is stopped; and a temporary stop recovery response time calculation unit for calculating a temporary stop recovery response time starting from when the transmission control unit controls the video distribution device connected to the second network and set in a temporarily stopped status to transmit the video data until the video data is transferred to the second buffer memory, wherein the transmission control unit controls reproduction, stop, temporary stop, and fast-forward for the video distribution device based on the reproduction control response time, the stop control response time, the temporary stop control response time, and the temporary stop recovery response time, to perform control so that the time stamps of the video data temporarily stored in the first buffer memory and the second buffer memory, respectively, are similar and contained at the same time.

* * * * *